United States Patent [19]
Van Lengerich et al.

[11] Patent Number: 5,015,489
[45] Date of Patent: * May 14, 1991

[54] PRODUCTION OF COOKIES WITH EXTRUSION AND POST EXTRUSION BAKING

[75] Inventors: Bernhard Van Lengerich, Ringwood; Cathryn C. Warren, Ridgewood, both of N.J.

[73] Assignee: Nabisco Brands, Inc., East Hanover, N.J.

[*] Notice: The portion of the term of this patent subsequent to Mar. 12, 2008 has been disclaimed.

[21] Appl. No.: 362,747

[22] Filed: Jun. 7, 1989

[51] Int. Cl.$^5$ .................................................. A21D 2/00
[52] U.S. Cl. .................................. 426/549; 426/244; 426/518; 426/551
[58] Field of Search ............... 426/549, 244, 518, 551

[56] References Cited

U.S. PATENT DOCUMENTS

| | | |
|---|---|---|
| 1,625,022 | 4/1927 | Fousek . |
| 2,120,138 | 6/1938 | Mathews et al. ............ 99/81 |
| 2,183,693 | 12/1939 | Rasch ........................ 107/14 |
| 2,488,046 | 11/1949 | Werner et al. ............. 107/29 |
| 2,582,542 | 1/1952 | Hein ........................... 107/29 |
| 2,838,012 | 6/1958 | Weidenmiller et al. ..... 107/29 |
| 2,838,013 | 6/1958 | Weidenmiller et al. ..... 107/29 |
| 3,021,220 | 2/1962 | Going et al. ................ 99/92 |
| 3,064,589 | 11/1962 | Genich ....................... 107/29 |
| 3,158,486 | 11/1964 | Mork et al. ................. 99/86 |
| 3,195,868 | 7/1965 | Loomans et al. .......... 259/104 |
| 3,215,094 | 11/1965 | Oldershaw et al. ........ 107/54 |
| 3,275,449 | 9/1966 | Fritzberg .................... 99/80 |
| 3,393,074 | 7/1968 | Ehrlich ....................... 99/92 |
| 3,424,590 | 1/1969 | Booras ........................ 99/90 |
| 3,458,321 | 7/1969 | Reinhart ..................... 99/80 |
| 3,462,276 | 8/1969 | Benson ....................... 99/81 |
| 3,480,445 | 11/1969 | Slaybaugh .................. 99/83 |
| 3,482,992 | 12/1969 | Benson ....................... 99/81 |
| 3,490,750 | 1/1970 | Brennan .................... 259/104 |
| 3,492,127 | 1/1970 | Ketch et al. ................ 99/86 |
| 3,615,675 | 10/1971 | Wisdom ...................... 99/83 |
| 3,682,652 | 8/1972 | Corbin et al. .............. 99/83 |
| 3,692,535 | 9/1972 | Norsby ........................ 99/92 |
| 3,732,109 | 5/1973 | Poat et al. ................... 99/83 |
| 3,753,729 | 8/1973 | Harms et al. ................ 99/82 |
| 3,767,421 | 10/1973 | Gulstad et al. ............. 426/153 |
| 3,767,422 | 10/1973 | Levitz ........................ 426/152 |
| 3,769,034 | 10/1973 | Dreier, Jr. et al. ......... 426/151 |
| 3,861,287 | 1/1975 | Manser ....................... 99/348 |
| 3,908,025 | 9/1975 | Miller et al. ............... 426/623 |
| 3,922,369 | 11/1975 | Glicksman et al. ........ 426/548 |
| 3,987,207 | 10/1976 | Spaeti et al. ............... 426/99 |
| 4,020,187 | 4/1977 | McCulloch et al. ....... 426/72 |
| 4,038,481 | 7/1977 | Antrim et al. ............. 536/56 |
| 4,039,168 | 8/1977 | Caris et al. ................. 259/9 |
| 4,044,159 | 8/1977 | Lutz ........................... 426/302 |
| 4,044,661 | 8/1977 | Balaz ......................... 99/355 |
| 4,099,455 | 7/1978 | Wenger et al. ............. 99/450.1 |
| 4,104,463 | 8/1978 | Antrim et al. ............. 536/56 |
| 4,126,710 | 11/1978 | Jaworshi et al. ........... 426/589 |
| 4,128,051 | 12/1978 | Hildebolt .................... 99/348 |
| 4,190,410 | 2/1980 | Rhodes ....................... 425/239 |
| 4,217,083 | 8/1980 | Machuque ................... 425/198 |
| 4,218,480 | 8/1980 | Dyson ......................... 426/19 |
| 4,219,580 | 8/1980 | Torres ........................ 426/549 |
| 4,225,630 | 9/1980 | Pitchon ...................... 426/623 |
| 4,239,906 | 12/1980 | Antrim et al. ............. 536/56 |
| 4,245,552 | 1/1981 | Small et al. ................ 99/483 |
| 4,251,551 | 2/1981 | VanHulle .................... 426/94 |
| 4,277,464 | 7/1981 | Reussner et al. .......... 424/177 |
| 4,285,271 | 8/1981 | Falck et al. ................ 99/348 |
| 4,318,931 | 3/1982 | Schiffman et al. ......... 426/243 |
| 4,322,202 | 3/1982 | Martinez .................... 425/208 |
| 4,344,975 | 8/1982 | Seiler ......................... 426/285 |
| 4,350,713 | 9/1982 | Dyson et al. ............... 426/243 |
| 4,379,171 | 4/1983 | Furda et al. ............... 426/291 |

(List continued on next page.)

FOREIGN PATENT DOCUMENTS

| | | |
|---|---|---|
| 1247926 | 1/1989 | Canada ....................... 99/113 |
| 0052046 | 5/1982 | European Pat. Off. . |
| 0098642 | 1/1984 | European Pat. Off. . |
| 102232 | 3/1984 | European Pat. Off. . |
| 0251375 | 1/1988 | European Pat. Off. . |
| 0134322 | 3/1985 | European Pat. Off. . |
| 0145550 | 6/1985 | European Pat. Off. . |
| 0213007 | 3/1987 | European Pat. Off. . |
| 252270 | 1/1988 | European Pat. Off. . |
| 0266958 | 5/1988 | European Pat. Off. . |

(List continued on next page.)

OTHER PUBLICATIONS

Anderson et al., "Gelatinization of Corn Grits by Roll Cooking Extrusion Cooking and Steaming", *Die Strake* 22, Jahrg. Nr.4, pp. 130-134.

(List continued on next page.)

*Primary Examiner*—Donald E. Czaja
*Assistant Examiner*—Mary S. Mims

[57] ABSTRACT

The present invention relates to the production of cookies which exhibit a cookie crumb-like structure and structural integrity using a cooker extruder to mix and heat ingredients comprising flour and oil to promote browning and flavor development. The dough-like mixture produced in the extrusion cooker is leavened and further browned using post-extrusion baking, such as microwave, dielectric radio frequency, infrared conductive, or convection baking, frying, or a combination thereof. The shortening or fat content of the dough-like mixture may be from about 12% by weight to about 40% by weight, preferably from about 20% by weight to about 30% by weight, based upon the weight of the dough-like mixture. Separation of oil from the remaining mass and extruder surging and starch gelatinization are avoided preferably by admixing water into heat-treated ingredients comprising flour and oil after and during substantial cooling of the heat-treated ingredients. The extruder is operated at low pressures, generally less than about 20 bars absolute, preferably less than about 10 bars absolute. The relative amount of solid, crystalline or granulated sugar, such as sucrose, subjected to the heat treatment may be used to control the tenderness and crunchiness of the final product.

82 Claims, No Drawings

U.S. PATENT DOCUMENTS

| | | | |
|---|---|---|---|
| 4,394,395 | 7/1983 | Rostagno et al. | 426/285 |
| 4,397,881 | 8/1983 | Crothers | 426/549 |
| 4,418,088 | 11/1983 | Cantenot | 426/549 |
| 4,431,674 | 2/1984 | Fulger et al. | 426/18 |
| 4,438,146 | 3/1984 | Colby et al. | 426/448 |
| 4,454,804 | 7/1984 | McCulloch | 99/348 |
| 4,455,333 | 6/1984 | Hong et al. | 426/94 |
| 4,465,447 | 8/1984 | Cheigh et al. | 425/72 |
| 4,465,452 | 8/1984 | Masuzawa | 425/308 |
| 4,478,857 | 10/1984 | Stauss | 426/72 |
| 4,492,250 | 1/1985 | Levine | 425/142 |
| 4,497,850 | 2/1985 | Gould et al. | 426/560 |
| 4,500,558 | 2/1985 | Fulger et al. | 426/463 |
| 4,503,080 | 3/1985 | Brabbs et al. | 426/94 |
| 4,563,358 | 1/1986 | Mercer et al. | 426/89 |
| 4,568,550 | 2/1986 | Fulger et al. | 426/19 |
| 4,568,551 | 2/1986 | Seewi et al. | 426/99 |
| 4,608,261 | 8/1986 | MacKenzie | 426/242 |
| 4,618,499 | 10/1986 | Wainwright | 426/283 |
| 4,650,685 | 3/1987 | Persson et al. | 426/285 |
| 4,661,360 | 4/1987 | Smith | 426/94 |
| 4,664,921 | 5/1987 | Seiden | 426/94 |
| 4,668,519 | 5/1987 | Dartey et al. | 426/548 |
| 4,685,878 | 8/1987 | Pinto | 425/202 |
| 4,693,899 | 9/1987 | Hong et al. | 426/94 |
| 4,741,264 | 5/1988 | McPeak | 99/483 |
| 4,752,484 | 6/1988 | Pflaumer et al. | 426/94 |
| 4,756,921 | 7/1988 | Calandro et al. | 426/560 |
| 4,762,723 | 8/1988 | Strong | 426/283 |
| 4,764,388 | 8/1988 | Sullivan et al. | 426/311 |
| 4,770,890 | 9/1988 | Giddey et al. | 426/549 |
| 4,771,915 | 9/1988 | Cand et al. | 222/56 |
| 4,777,057 | 10/1988 | Sugisawa et al. | 426/412 |
| 4,778,690 | 10/1988 | Sadel, Jr. et al. | 426/560 |
| 4,786,514 | 11/1988 | Wiedmann | 426/231 |
| 4,828,853 | 5/1989 | Banks et al. | 426/94 |
| 4,844,937 | 7/1989 | Wilkinson et al. | 426/559 |
| 4,844,938 | 7/1989 | Amamoto et al. | 426/589 |
| 4,851,247 | 7/1989 | Greenhouse et al. | 426/250 |
| 4,892,471 | 1/1990 | Baker et al. | 425/132 |
| 4,911,939 | 3/1990 | Lou et al. | 426/241 |
| 4,948,611 | 8/1990 | Cummins | 426/503 |
| 4,948,612 | 8/1990 | Keller et al. | 426/549 |

FOREIGN PATENT DOCUMENTS

| | | |
|---|---|---|
| 0275878 | 7/1988 | European Pat. Off. |
| 0296039 | 12/1988 | European Pat. Off. |
| 3238791 | 4/1984 | Fed. Rep. of Germany |
| 2602398 | 2/1988 | France |
| 0173040 | 7/1984 | Japan |
| 0241841 | 11/1985 | Japan |
| 291249 | 8/1985 | Netherlands |
| 0558141 | 12/1943 | United Kingdom |
| 1175595 | 12/1969 | United Kingdom |
| 1254562 | 11/1971 | United Kingdom |
| 1471108 | 4/1977 | United Kingdom |
| 1561190 | 2/1980 | United Kingdom |
| 2131670 | 6/1984 | United Kingdom |
| 2132868 | 7/1984 | United Kingdom |
| 2136660 | 9/1984 | United Kingdom |
| 8606938 | 12/1986 | World Int. Prop. O. |

OTHER PUBLICATIONS

Anderson et al., "The Terminology and Methodology Associated with Basic Starch Phenomena", *Cereal Foods World*, vol. 33, No. 3, p. 306 (Mar. 1988).

Atwell et al., "The Terminology and Methodology Associated with Basic Starch Phenomena", *Cereal Foods World*, vol. 33, No. 3, p. 306 (Mar. 1988).

Continuous Twin-Screw Processing-Future Oriented Technology, Werner of Pfleiderer Corporation, 663 East Cresent Avenue, Ransey, N.J. (Undated).

*Koch-Und Extrudier-Techniken*, "Biscuits", Internationales Susswaren-Institut (1982).

Leung et al, "Storage Stability of a Puff Pastry Dough With Reduced Water Activity", *J. Food Science*, vol. 49, No. 6, p. 1405 (Nov.-Dec. 1984).

Lorenz et al, "Baking With Microwave Energy", *Food Technology*, pp. 28-36 (Dec. 1973).

Mercier et al, *Extrusion Cooking*, pp. 347-353 and 404-415 (1989).

Nestl, Birgit, Doctoral Thesis, Entitled, "Formula and Process Optimization for the Extrusion of Baked Goods Under Particular Consideration of Various Lipids and Sweetners (Dietetic Products and Products with Different Nutritional Value)", Justus-Liebig. University of Giessen, Giessen, W. Germany (Filed Mar. 1989).

Processing: Extruded Snacks, Werner and Pfleiderer, GmbH, Postfach 30 1220 Theodorstrasse 10 7000 Stuttgart 30, West Germany.

Rossen et al., "Food Extrusion", *Food Technology*, pp. 46-53 (Aug. 1973).

Sanderude, K., "Continuous Cooking Extrusion: Benefits to the Snack Food Industry", *Cereal Science Today*, vol. 14, No. 6, pp. 209-210 and 214 (Jun. 1969).

Unique Cooker Extruder, Food Engineering Intl., pp. 41-43 (May 1983).

Woollen, A., "Higher Productivity in Crispbread", *Cereal Foods World*, vol. 30, No. 5, pp. 333-334 (May 1985).

PRODUCTION OF COOKIES WITH EXTRUSION AND POST EXTRUSION BAKING

FIELD OF THE INVENTION

The present invention relates to the production of cookies having a crumb-like structure using extrusion heat treatment and post extrusion baking.

BACKGROUND OF THE INVENTION

In the production of a high oil content farinaceous composition by extrusion cooking, mobility and immiscibility of the water and oil phases generally increase with increasing temperature. Additionally, the mechanical action of extruder screws tends to increase separation of oil from the remaining mass. The tendency for the oil to separate is at locations within the extruder at which the components are subjected to the highest pressure. Exemplary of high pressure locations in a twin screw extruder are: (1) the space between the extruder screw tips and the die orifice, and (2) the narrowest or more restricted passageways between the left and right hand screw elements.

Oil separation under system pressure (screw or die pressure) can be manifested in extruder surging or uneven mass flow rates from the die. Upon extrusion from the die, separated oil may: (1) appear as a coating on the remaining dough mass, or (2) periodically discharge separately from the remaining dough mass. Non-homogeneous dough production and discontinuous extruder operation may thus result from oil separation. The problem of oil separation increases with increasing oil levels.

Water separation from flour, up to the boiling point of water, is generally not a problem because of the more hydrophilic properties of flour components such as gluten and starch. As flour and water temperatures are raised, increased migration of water into starch granules, protein (e.g. gluten) denaturization, and starch gelatinization tend to occur. The binding or reaction of water with flour components may promote separation of oil: (a) by making the flour components more polar or hydrophilic and (b) by creating a greater mass of hydrophilic components.

Conventional cookie production involves forming cookie dough preforms or pieces followed by baking of the pieces. Low temperatures, typically at about room temperature, are used to form the dough. The low temperature mixing generally avoids separation of shortening or fat from hydrophilic dough components While baking temperatures in a conventional oven, such as a band oven, may promote oil separation, there is no mixing or pressing action performed at the baking temperatures. Any oil separation which may occur in such ovens does not generally interfere with continuous operability of the cookie production process as it would in a continuous cooker/extruder process.

In addition to high temperature mixing and high system pressure, the presence of sugar in a cookie dough may also increase oil and water separation. Solubilization of sugars in water increases the relative amount of the hydrophilic mass. This in turn may tend to promote oil separation.

In the process of the present invention, cookie products are produced using an extrusion cooker to promote Maillard browning and flavor development without the problems caused by the separation of oil from the remaining cookie dough mass. The extruded cookies or cookie-like products of the present invention have a cookie crumb or crumb-like structure and texture and exhibit structural integrity.

SUMMARY OF THE INVENTION

The present invention provides a continuous process for the production of cookies which exhibit a cookie crumb-like structure and structural integrity using a cooker extruder and post extrusion heating, such as dielectric radio frequency baking, microwave baking, conductive baking, hot air baking, infra red heating, frying or combinations thereof. A cookie crumb-like structure is achieved by avoiding substantial starch gelatinization. Ingredients comprising flour and shortening or fat are admixed and heated in a cooker extruder. Preferably, the starch carrying ingredients are coated with the oil, and then water is added to the hot flour and oil mass during and/or after heat treatment. Using an amount of water such that the water content of the dough-like mixture is sufficiently low so as to avoid substantial starch gelatinization further assures that no or substantially no starch gelatinization occurs. The use of low water contents also tends to reduce oil separation from hydrophilic cookie dough components at elevated temperatures.

In embodiments of the present invention the ingredients are heated in the cooker extruder to a high temperature, for example at least about 150° F., to reduce post extrusion baking time, and promote Maillard browning and flavor development. Preferably, the ingredients are heated to a temperature of at least about 200° F., more preferably at least about 250° F., most preferably from about 300° F. to about 500° F., to obtain a heat-treated mass. The heat treated mass is formed at a relatively low pressure within the cooker extruder, generally less than about 20 bars absolute, preferably less than about 10 bars absolute.

Preferably, the heat treated mass temperature upon addition of or during admixing with water or a liquid source of water is from about 100° F. to about 300° F., more preferably from about 110° F. to about 212° F. If the heat treated mass temperature is too low, viscosity may deleteriously increase, mixing may be more difficult, pressure may increase and substantial oil separation or surging may occur. Also, higher temperatures in the cooker extruder reduce post extrusion heating times.

In embodiments of the present invention, the heat treated mass is cooled and admixed at low pressures with liquid water or a source of water and optional sugar to obtain a substantially homogeneous dough-like mixture. The heat treated mass is cooled to a sufficiently low temperature so that upon its encountering of points of high pressure, the added water does not cause substantial oil separation and extruder surging Cooling of the heat treated mass is preferably initiated prior to and continues after addition of the water. The temperature of the dough-like mixture which is formed is most preferably less than about 150° F. but above about 100° F. at the exit end of the extruder.

The added shortening or fat content of the dough-like mixture may, for example, be from about 12% by weight to about 40% by weight, preferably from about 20% by weight to about 30% by weight, based upon the weight of the dough-like mixture.

The elimination or significant reduction of added water or a source of added water in a cooker extruder tends to reduce oil separation from hydrophilic cookie dough components at elevated temperatures. It also reduces post extrusion heating time. However, added water or a source of water is needed in cookie production for formability or machinability of cookie doughs into sheets or pieces at high production rates. Water also helps to disperse cookie ingredients and to promote flavor and color development.

In the present invention, preferably the amount of water added is less than the amount needed to reach a threshold or maximum consistency. In preferred embodiments of the present invention, the amount of water added to the heat treated mass may range from about 0.5% by weight to about 10% by weight, based upon the weight of the dough-like mixture It may, for example, be from about 2% by weight to about 6% by weight, based upon the weight of the dough-like mixture, depending upon the heat treatment temperatures and the desired consistency for shaping or forming.

The water content of the dough-like mixture is preferably as low as possible to reduce post extrusion heating time and to reduce the risk of substantial oil separation and extruder surging. It is generally less than about 20% by weight, preferably less than about 15% by weight, more preferably less than about 10% by weight, based upon the weight of the dough-like mixture.

Process compatible ingredients can be added to adjust the texture of the products produced by the process of the present invention. For example, the relative amount of at least one solid, crystalline, or granulated sugar, such as sucrose, which is subjected to the heat treatment can be used to control the tenderness and crunchiness of the final product. Addition of a solid, or crystalline or granulated sugar, such as sucrose, and subjecting it to high extrusion temperatures tends to melt and/or dissolve the sugar crystals and thus promote a crunchy texture in the final product. Addition of all or a portion of the solid sugar to the cooled mass rather than subjecting it to high extrusion temperatures tends to avoid sugar melting and/or dissolution, and promotes a tender texture in the final product. In embodiments of this invention the sugar component may be added in an amount to provide, for example, from about 10% by weight to about 40% by weight, preferably from about 20% by weight to about 30% by weight total sugar solids, based upon the total weight of the dough-like mixture. Crystalline or granulated sucrose alone or used with other sugars is preferred.

Dough-like mixtures of the present invention are extrudable through a die into a continuous rope or sheet. The pressure drop upon extrusion or across the extruder die is generally less than about 20 bars absolute, preferably less than about 10 bars absolute. The work done on the dough-like mixture, defined as the specific mechanical energy is generally low, for example less than about 40 watt-hrs/kg (or 18 watt-hrs/lb). Preferably, substantial frictional heating does not occur in the cooker extruder with substantially all of the heating being provided by external or jacketed heaters.

Puffing or expansion due to moisture or steam release upon exiting of the dough-like mass from the extruder typically does not occur. The extrudate is formed into pieces and the pieces are leavened and further browned by subjecting them to at least one other heating source, such as a microwave oven, infrared oven, convection oven, dielectric radio frequency oven, a fryer, or conductive heater, to obtain cookie products which exhibit structural integrity and a crumb-like structure and texture. Generally, the volume increase upon post extrusion heating ranges from about 20% to about 200%.

Leavening agents are optional and may be included in amounts up to about 5% by weight, based upon the weight of the dough-like mixture. Dough-like mixtures of the present invention having a shelf-stable water activity of less than about 0.7, preferably less than about 0.6 may be packaged as shelf stable products in moisture and oxygen impermeable packaging materials for subsequent leavening and browning in conventional home microwave or convection ovens.

DETAILED DESCRIPTION OF THE INVENTION

In the present invention cookies are continuously produced using an extrusion cooker to continuously mix ingredients, to reduce post extrusion heating time, and to promote browning and flavor development. The dough-like mixture continuously produced in the extrusion cooker is leavened using at least one other energy source to obtain baked goods having a crumb-like structure or cookie crumb. The post extrusion leavening may be by microwave energy, dielectric radio frequency energy, infrared energy, conductive heating, frying, or heated air, such as from a convection oven or fluidized bed heater. In addition to leavening the composition, the post extrusion heating further browns the dough-like mixture.

Separation of oil from the remaining mass and extruder surging are avoided preferably by admixing water into heat-treated ingredients comprising flour and oil which are at a temperature of about 100° F. to about 300° F., more preferably from about 110° F. to about 212° F. In embodiments of the present invention, water addition may be after and/or during substantial cooling of the heat treated ingredients. After the cooling of the heat treated ingredients, the post extrusion heating leavens the substantially unleavened extrudate. The volume increase resulting from the post extrusion heating or leavening step generally ranges from about 20% to about 200%, based upon the volume of the extrudate.

The flour component may be any comminuted cereal grain or edible seed meal, derivatives thereof and mixtures thereof. Exemplary of the flour components which may be used are wheat flour, corn flour, oat flour, barley flour, rye flour, rice flour, potato flour, grain sorghum flour, corn starch, physically and/or chemically modified flours or starches, such as pregelatinized starches, and mixtures thereof. The flour may be bleached or unbleached. Wheat flour or mixtures of wheat flour with other grain flours are preferred. The amount of flour used in the compositions of the present invention ranges, for example, from about 30% by weight to about 70% by weight, preferably from about 45% by weight to about 55% by weight. Unless otherwise indicated, all weight percentages are based upon the total weight of all ingredients forming the dough-like mixtures or formulations of the present invention except for inclusions such as flavor chips, nuts, raisins, and the like. Thus, "the weight of the dough-like mixture" does not include the weight of inclusions.

The flour may be replaced in whole or in part by flour substitutes or bulking agents such as, polydextrose, hollocellulose, microcrystalline cellulose, mixtures thereof, and the like. Corn bran, wheat bran, oat bran, rice bran, mixtures thereof, and the like, may also be substituted in whole or in part for the flour for making a fiber enriched product, to enhance color, or to affect texture.

Corn flour and/or wheat bran may be used, for example, to enhance color and affect texture. Exemplary amounts range up to about 15% by weight corn flour and up to about 20% by weight wheat bran, the percentages being based upon the total weight of ingredients forming the dough-like mixture. Preferably, the corn flour and wheat bran will each comprise from about 1 to about 10% by weight, more preferably from about 2% by weight to about 5% by weight, based upon the weight of the dough-like mixture.

The shortening or fat used in the present invention may be any edible fat or oil or mixture thereof suitable for baking applications and may include conventional food-grade emulsifiers. Vegetable oils, lard, marine oils, and mixtures thereof which are fractionated, partially hydrogenated, and/or interesterified are exemplary of the shortenings or fats which may be used in the present invention. Edible reduced or low calorie, or non-digestible fats, fat substitutes, or synthetic fats, such as sucrose polyesters which are process compatible may also be used. The shortenings or fats may be solid or fluid at room temperatures of from about 75° F. to about 90° F. The use of components which are solid or semi-solid at room temperatures are preferred so as to avoid possible oil seepage from the final product during storage. The shortening or fat component is preferably added to the extruder in the form of a heated oil to facilitate metering, mixing, and a fast heat up of the added ingredients.

Generally, the amount of the shortening or fat component admixed with the flour component is, for example, at least about 12% by weight, and may, for example, go up to about 40% by weight, based upon the weight of the dough-like mixture. It preferably ranges from about 20% by weight to about 30% by weight, based upon the weight of the dough-like mixture.

Exemplary emulsifiers which can be used include lecithin, sorbitan monostearate, mono- and/or diglycerides, polyoxyethylene sorbitan fatty acid esters, such as polysorbates (e.g., polyoxyethylene (20) sorbitan monostearate), and sodium stearoyl-2-lactate. Exemplary amounts are up to about 3% by weight of one or more emulsifiers based upon the weight of the flour.

Process compatible ingredients which can be used to modify the texture of the products produced in the present invention include sugars such as sucrose, fructose, lactose, dextrose, galactose, maltodextrins, corn syrup solids, hydrogenated starch hydrolysates, protein hydrolysates, mixtures thereof, and the like. Reducing sugars, such as fructose, maltose, lactose, and dextrose or mixtures of reducing sugars may be used to promote browning. Fructose is the preferred reducing sugar, because of its ready availability and its generally more enhanced browning and flavor development effects. Exemplary sources of fructose include invert syrup, corn syrup, high fructose corn syrup, molasses, brown sugar, maple syrup, mixtures thereof, and the like.

The texturizing ingredient, such as sugar may be admixed with the other ingredients in either solid or crystalline form, such as crystalline or granulated sucrose, granulated brown sugar, or crystalline fructose, or in liquid form, such as sucrose syrup or high fructose corn syrup. Humectant sugars, such as high fructose corn syrup, may be used to promote chewiness in the post-extrusion baked product.

In embodiments of the present invention, the total sugar solids content, or the texturizing ingredient content, of the dough-like mixtures of the present invention is, for example, at least about 10% by weight, and may, for example, go up to about 40% by weight, based upon the weight of the dough-like mixture. It preferably ranges from about 20% by weight to about 30% by weight, based upon the weight of the dough-like mixture.

Crystalline or granulated sucrose alone or with other sugars is preferred in the present invention. The sucrose content may, for example, be at least about 80% by weight, based upon the total sugar solids content of the dough-like mixture. The balance of the sugar solids may comprise fructose, dextrose, lactose, or mixtures thereof, for example. Sugar granulations which may be used range, for example, from about 4× to about 12×.

The moisture contents of the dough-like mixtures of the present invention should be sufficient to provide the desired consistency to enable proper forming, machining, and cutting of the dough. The total moisture content of the dough-like compositions of the present invention will include any water included as a separately added ingredient, as well as the moisture provided by flour (which usually contains about 12% to about 14% by weight moisture), and the moisture content of other dough additives included in the formulation, such as high fructose corn syrup, invert syrups, or other liquid humectants.

Taking into account all sources of moisture in the dough-like mixture including separately added water, the total moisture content of the dough-like mixtures of the present invention is generally less than about 20% by weight, preferably less than about 15% by weight, more preferably less than about 10% by weight, based upon the weight of the dough-like mixture. The dough-like compositions of the present invention generally have a water or moisture content of at least about 5% by weight, based upon the weight of the dough-like composition.

Generally, if the amount of added water is too low, the extrudate will tend to be slurry-like and cannot be cut into pieces. As the amount of water is increased the extrudate consistency increases, until a threshold level is reached. At this level, additional water reduces the consistency. However, as the amount of water is increased to reduce the consistency, there is an increased risk of substantial oil separation and extruder surging. The lower the pressure and/or temperature to which the heat treated mass is subjected to after water addition: the lower is the risk. Thus, adding an extrusion die to the extruder: (a) increases the pressures encountered by the ingredients in the extruder which, (b) increases the risk that the addition of water beyond the amount needed to reach the threshold level of consistency will result in oil separation which can reduce machinability.

The consistency of the extrudate can be determined by measuring the force needed to penetrate a sample at a constant rate of penetration. An Instron Texture Analyzer Model 4202 can be used to determine the modulus of the sample, which is a measurement of the consistency of the sample. The modulus is the slope, in the linear region, of a plot of the strain or deformation (x-axis) versus the stress (y-axis). The strain can be measured in inches and the stress can be measured in lbs force. A cylindrical shaped probe having a diameter of 4 mm can be used for the measurement of the consistency. The probe can be set to penetrate the sample at a constant speed of 0.2 inches/min. The sample dimensions can be about 1 inch square and ¼ inch high, or thick. The sample temperature can be room temperature (about 70°–75° F.) or higher. The more force required to penetrate the sample, the greater is its modulus and the greater is its consistency.

Consistencies suitable for forming or cutting operations depend upon the particular operation and particular equipment utilized. For example, a consistency which is too high for wire cutting may be suitable for sheeting or rotary molding. For rotary molding, the consistency at about the threshold level is suitable. For extrusion through a die, for producing a sheet for example, or for wire cutting, the consistency should be less than the threshold value. However, to reduce the risk of substantial oil separation in the extruder or in post extrusion forming operations and to reduce post extrusion baking times, it is generally preferred that the amount of water added be less than the amount needed to reach the threshold or maximum consistency. Thus, it is generally preferred that the water content of the dough-like mixture is such that additional water will increase the consistency of the dough-like mixture.

If the ratios of the amounts of the other ingredients are kept constant then: the amount of water added which is needed to reach the threshold level of consistency will depend upon the heat treatment of the ingredients. Generally, the longer the heating, or the higher the temperature of heating, the lower is the amount of water needed to reach the threshold level of consistency.

In preferred embodiments of the present invention, the amount of water admixed with the heat treated mass may range, for example, from about 0.5% by weight to about 10% by weight, based upon the weight of the dough-like mixture. Depending upon the time and intensity of heat treatment and the consistency needed for shaping or forming, and the pressures involved, it may be more preferably from about 2% by weight to about 6% by weight, based upon the weight of the dough-like mixture.

The added water may be in the form of pure or tap water, a liquid source of water, such as sucrose syrup, corn syrup, high fructose corn syrup, eggs, honey, molasses, mixtures thereof, and the like, alone or in combination with a dry source of water, such as the moisture content of dried eggs, corn syrup solids, and the like. Water, in the form of tap water or a liquid source of water, such as high fructose corn syrup, for example, may also be added in the heat treating stage. It may be added with the flour for example, in low amounts (e.g. less than about 2% by weight, based upon the weight of the dough-like mixture) which do not result in: (a) substantial oil separation or extruder surging or, (b) substantial starch gelatinization.

In addition to the foregoing, the dough-like mixtures of the invention may include other additives conventionally employed in cookies. Such additives may include, for example, milk by-products, egg or egg by-products, cocoa, vanilla or other flavorings, as well as inclusions such as nuts, raisins, coconut, flavored chips such as chocolate chips, butterscotch chips and caramel chips, and the like.

A source of protein which is suitable for inclusion in baked goods may be included in the dough-like compositions of the present invention to promote Maillard browning. The source of protein includes non-fat dry milk solids, dried or powdered eggs, mixtures thereof, and the like. The amount of the proteinaceous source may, for example, range up to about 5% by weight, based upon the weight of the dough-like mixture.

The dough-like cookie compositions of the present invention may contain up to about 5% by weight of a leavening system, based upon the weight of the dough-like mixture. Chemical leavening agents or injected gases such as carbon dioxide can be used, but are not necessary for leavening the dough-like compositions of the present invention. Leavening action may be achieved by post extrusion heating of the composition which is sufficient to vaporize water in the dough-like cookie composition. However, the leavening agents may be used to adjust or control the degree of leavening and/or to control the pH of the cookie products.

The inclusion of a leavening agent or other edible pH-adjusting agents may promote browning of the cookie mixture during processing within the extruder or during post-extrusion heating. A desired pH for the cookies or the dough-like mass is from about 5 to about 9.5, preferably from about 7 to 8.5. Generally, the more alkaline the composition, the greater the degree of browning. However, the pH should be adjusted so as not to adversely affect taste of the final product. A higher pH may be used to promote browning when forming the heat treated mass of the present invention, followed by adjustment of the pH after and/or during cooling of the heat treated mass. Exemplary of chemical leavening agents or pH adjusting agents which may be used include alkaline materials and acidic materials such as sodium bicarbonate, ammonium bicarbonate, sodium acid pyrophosphate, tartaric acid, mixtures thereof, and the like.

In the process of the present invention, the flour component and shortening or fat are continuously and separately fed into the upstream portion of a cooker extruder. One or more crystalline or granulated sugars may be continuously added or preblended with the flour. However, continuous separate addition of the crystalline sugar to the upstream end of the extruder is preferred to avoid particle separation in the dry blend. The flour component, the shortening or fat, and the sugar components are generally initially conveyed in the extruder with cooling or without the application of external heat. They are conveyed and admixed while being heated to obtain a heat treated mass.

In the present invention, the ingredients may be heated to temperatures above the minimum gelatinization temperature of the starch (assuming that a sufficient amount of water was available for reaction with the starch) but no or substantially no gelatinization (measured by differential scanning calorimetry) occurs. It is desireable that the oil sufficiently coats the starch containing flour particles to prevent substantial penetration of moisture into the starch granules so as to avoid substantial gelatinization.

A cookie crumb-like structure is obtained by avoiding substantial starch gelatinization. Generally, starch gelatinization occurs when: (a) water in a sufficient amount, generally at least about 30% by weight, based upon the weight of the starch, is added to and mixed with starch and, (b) the temperature of the starch is raised to at least about 80° C. (176° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in property such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomenon," *Cereal Foods World.* Vol. 33, No. 3, Pgs. 306–311 (March 1988).

In the present invention, conditions under which no or substantially no gelatinization is preferably achieved are by embedding or coating the starch carrying ingredients, such as wheat flour, within the oil and then adding the water to the flour and oil mass. No or substantially no gelatinization may also be further assured by: (a) reducing or substantially eliminating the addition of water, and/or (b) admixing the water with the heat treated mass below the minimum temperature at which starch gelatinization can occur.

In the process of the present invention, heating of the flour, shortening or fat, and sugar at as high a temperature as possible and for as long as possible for a maximum throughput rate without burning or other deleterious effects, is generally desirable for the development of browning and flavor. Maillard browning and flavor development involve the reaction between a reactive carbonyl group of a carbohydrate and a primary amino acid of the composition. The reaction proceeds through a series of intermediate reactions to finally produce the brown nitrogenous polymers. The heat treating step is believed to at least develop precursors to the polymeric nitrogen containing compounds. During the post-extrusion baking step, the colors develop faster than an uncooked dough under similar baking conditions.

The flour component, shortening or fat component, and optionally the sugar or other texturizing components are heated in the cooker extruder generally to a temperature of at least about 150° F., preferably at least about 200° F., more preferably at least about 250° F., and most preferably from about 300° F. to about 500° F. The average residence time for the flour, shortening or fat, and optional sugar components at these elevated temperatures is, for example, from about 15 seconds to about 90 seconds.

The heat treated mass is formed at a relatively low pressure within the cooker extruder. Pressures during the heat treating stage are generally less than about 20 bars absolute, preferably less than about 10 bars absolute. It is believed that the use of low pressures in the cooker extruder reduces the tendency for oil to separate from the remaining cookie ingredients. Preferably, substantially no frictional heating occurs in the cooker extruder. Substantially all of the heating is preferably supplied by external or jacketed heating means. Generally, the work done in the production of the dough-like mixture is low, for example, less than about 40 watt hrs/kg (or less than about 18 watt hrs/lb).

The heat treated mass temperature before and/or during admixing with water or a liquid source of water should be sufficiently low so that the added water does not result in substantial separation of oil and extruder surging. The reduction of the temperature of the heat treated mass substantially reduces mobility and immiscibility of the water and oil phases. Also, it has been observed that the oil is most likely to separate from the remaining mass at the points of highest pressure, such as at the extruder die. Generally, the lower the pressures encountered by the heat treated mass upon or subsequent to the addition of the water, the less the heat treated mass needs to be cooled to avoid substantial oil separation and extruder surging.

If the heat treated mass temperature is too low upon and/or during admixing it with the water or liquid source of water, viscosity may deleteriously increase. This may result in mixing difficulties, pressure increases, and substantial oil separation and extruder surging. Additionally, the less cooling performed within the extruder, the less is the amount of post extrusion heating needed for leavening.

If pressures are sufficiently low (such as when an extruder die is not utilized) and if the mass temperature during heat treatment is sufficiently low, no or substantially no cooling may be needed to avoid substantial oil separation or extruder surging. However, higher heat treated mass temperatures are preferred for: (1) the promotion of browning and flavor development, and (2) reduced post extrusion heating times. Thus, it is generally preferred that the heat treated mass be heated to a high temperature, for example about 300° F. to about 500° F., and that the heat treated mass temperature be reduced, as needed to avoid substantial oil separation or extruder surging, before and/or during admixing it with water or a liquid source of water. Cooling of the heat treated mass is preferably initiated prior to and continues during admixing it with water or a liquid source of water to reduce the risk of substantial oil separation upon mixing or extrusion.

Preferably, the heat treated mass temperature upon addition of water or a liquid source of water is from about 100° F. to about 300° F., more preferably from about 110° F. to about 212° F. Generally, the heat treated mass undergoes a temperature drop of at least about 35° F., preferably at least about 50° F. before and/or during admixing it with the water or liquid source of water. The heat treated mass is preferably cooled to a temperature below the boiling point of water (212° F.), more preferably to a temperature lower than about 200° F., most preferably less than about 150° F. before or during admixing it with the water or liquid source of water to reduce the risk of substantial steam generation, and substantial oil separation and extruder surging. Admixing the water or liquid source of water with the heat treated mass at a mass temperature which is lower than the minimum gelatinization temperature of the starches included in the formulation may further assure that no or substantially no starch gelatinization occurs, particularly as the amount of water is increased.

At the exit end prior to or at the optional extruder die, which is generally the point of maximum pressure, the temperature of the dough-like mixture which is formed in the extruder should be less than the boiling point of water (212° F.), more preferably less than about 200° F., most preferably less than about 150° F. Generally, the temperature of the heat treated mass and dough-like mixture in the extruder should not be reduced to below about 100° F., for example, to avoid mixing difficulties, increased pressure, or increased risk of substantial oil separation or extruder surging due, for example, to increased viscosity or oil solidification. Also, excessively low extrudate temperatures may impair post extrusion forming, shaping, and cutting operations. Increased post extrusion heating times and/or temperatures for leavening purposes also result from excessive cooling.

In producing the dough-like mixtures in accordance with the present invention it is preferred that substantially no moisture content reduction occurs and that the dough-like mixture retains a sufficient amount of water for proper leavening during post extrusion heating.

All or a portion of the texturizing ingredient, such as solid, crystalline or granulated sugar, may be admixed with the cooled heat treated mass at the same or at a different location from addition of the water or other aqueous source to control the texture of the final baked product.

Addition of a solid, crystalline or granulated sugar, such as sucrose, and subjecting it to high extrusion temperatures tends to promote sugar melting and/or dissolution and thus a crunchy texture in the final product. Addition of all or a portion of the crystalline sugar to the cooled mass rather than subjecting it to high extrusion temperatures tends to avoid excessive sugar melting, and/or solubilization and promotes a tender texture in the final product. Thus, all, a portion (e.g. about 15% to about 85% by weight, based upon the total amount of solid, crystalline or granulated sugars), or none of the solid or crystalline sugars may be subjected to the heat treating stage to control texture in the final, post extrusion baked product.

Also, the greater the degree, or portion of sugar melting and/or dissolving, the less the viscosity of the extrudate. Accordingly, the relative amounts of solid or crystalline sugar: (a) subjected to heat treatment upstream, and (b) subjected only to the downstream cooling stage may be used to control the extrudate viscosity for subsequent forming or machining, and/or to control the texture of the final baked good.

The downstream addition of a texturizing ingredient, such as sugar, reduces the mass subjected to heat treatment which permits heating of the upstream ingredients to a higher temperature at a given throughput rate. Also, the downstream addition of the texturizing ingredient such as sugar, which is at a relatively low temperature (e.g. about room temperature) helps to cool the heat treated mass.

Various granulations may also be used to control the degree of sugar melting and/or dissolving, with larger sizes tending to result in less melting or dissolving. The addition of liquid sugar, such as sucrose syrup, may additionally promote crunchiness of the final product.

The residence time of the added liquid water or added liquid source of water, as well as the residence time of the texturizing ingredient, such as sugar, added downstream after initiation of the reduction of the heat treated mass temperature should be sufficient to enable the attainment of a substantially homogeneous dough-like mixture. The residence time in the cooling or reduced temperature stage should also be sufficiently long to reduce the mass temperature so as to avoid substantial expansion or puffing of the dough-like mass upon extrusion. The average residence time in the cooker extruder of the water and crystalline sugar added to the heat treated mass may, for example, be from about 10 seconds to about 60 seconds.

Just prior to extrusion, or upon extrusion through an extruder die, the dough-like mixture may be heated, for example, by about 5° F. to about 30° F. This heating may be used to adjust dough consistency or viscosity provided that adverse oil separation or extruder surging does not occur. The post cooling heating may be used, for example, for controlling flow in the die, particularly at low moisture contents.

The pressure in the cooling stage is generally less than about 20 bars absolute, preferably less than about 10 bars absolute. The pressure drop across the extrusion die is generally less than about 20 bars and preferably less than about 10 bars. Low pressures are preferred to avoid separation of oil from the remaining mass and to avoid surging.

The leavening agents or pH adjusters may be added to the cooled mass in the cooling stage or they may be added prior to the cooling stage. They may be added in dry form either separately or as a pre-blend with the flour or solid or crystalline sugar, for example. They may also be added in aqueous form separately or as part of the added water. Emulsifiers may suitably be added with the shortening or fat in the heating stage or with the water in the cooling stage of the process of the present invention.

Ingredients which promote Maillard browning, such as proteinaceous materials and reducing sugars are preferably added in the heat treating stage. The dry ingredients may, for example, be preblended with the flour or added separately. The proteinaceous materials and the reducing sugars may also be added in the cooling stage depending upon the degree of browning desired, and the water content of the ingredients. These ingredients, as well as any other additives in dry form may be preblended with the upstream or downstream sugar, for example, or added separately therefrom. Likewise, additives which are in liquid form may be preblended with the added water or liquid source of water or they may be separately added to the extruder. Generally, preblending of minor ingredients for addition to the extruder is preferred for achieving homogeneity.

Heat labile ingredients, such as various vitamins, minerals, flavorings, coloring agents, sweeteners, such as aspartame, and the like, are preferably added in the cooling stage so as to reduce the possibility of thermal decomposition or degradation. The heat labile ingredients may, for example, be preblended with sugar added downstream in the cooling stage or with the added water. They may also be added separately, for instance downstream of the sugar or water addition.

Shear sensitive ingredients, such as chocolate chips or other flavored chips, raisins, nuts, fruit pieces or other inclusions or particulates are preferably added to the cooling stage. The shear sensitive ingredients are most preferably added downstream of the downstream sugar and water addition. Adding the shear sensitive ingredients near the exit or in the last barrel section of the extruder serves to maintain particle integrity by reducing their exposure to the mechanical action of the screw elements. Flavor chips, such as chocolate chips may be added at temperatures below room temperature, for example at about 20° F. to about 65° F. so as to reduce melting of the chips in the dough-like mixture.

The dough-like mixture is extruded from the cooker extruder to obtain an extrudate without substantial moisture loss or flashing because the temperature of the dough-like mixture exiting the extruder is less than about 212° F. The extruded dough-like mixtures of the present invention will preferably have a shelf-stable water activity of less than about 0.7, preferably less than about 0.6. The shelf-stable compositions of the present invention may be packaged as shelf stable products in moisture and oxygen impermeable packaging materials for subsequent leavening and browning in a post extrusion oven such as a conventional home microwave or convection oven.

The dough-like mixture may exit the extruder through a die having various shapes, such as animal shapes, circles, squares, triangles, star-shapes, and the like. The extrudate may be cut at the die by a rotating knife for example, or by a wire cutting device.

The dough-like mixture may be formed into a continuous rope by the use of a round shaped die orifice. It may also be formed into a ribbon or sheet by the use of a horizontally oriented slit or elongated sheet shaped die orifice. The continuous ropes, ribbons, or sheets may be cut into pieces using known reciprocating cutters.

The dough-like mixtures of the present invention may be extruded without the use of a die plate. The thus obtained extrudate, or even die-extruded extrudates, may be formed into pieces using conventional dough-shaping and forming equipment, such as rotary molders, wire cutting machines, sheeting rolls and reciprocating cutters, and the like.

Unlike conventional cookie production, the extruded dough-like mixtures of the present invention are generally formed into pieces when hot. Excessive cooling of the extrudate may result in crumbling of the pieces upon wire cutting or other cutting or shaping operations. Preferably, the extrudates are formed into pieces at temperatures of from about 100° F. to about 150° F.

Consistency, viscosity and plasticity of the extrudates for proper machining may be adjusted, for example, by water or oil addition or reduction in the extruder, or by heating prior to the die, at the die, or after exiting from the die.

Cookie bits or cookie crumb-like products may be produced by extruding the dough-like mixture under very low pressure drops, e.g. without passing it through an extruder die, or at low die flow rates so that the extrudate spontaneously forms into pieces upon falling, onto a moving belt for example. Pieces or drops may also be produced by passing the dough-like mixture through a horizontal or vertical extruder die with a multitude of holes of a size of about ⅛" to about ¼". The extrudate strands may then be cut at the die by a rotating knife into cylindrically shaped preheated dough bits.

The pieces may then be leavened by post extrusion heating to form cookie-like pieces or bits. The bits may be screened or sized to obtain cookie bits or "cookie chips" having a substantially uniform size distribution.

The cookie bits or cookie chips may be incorporated into other products, such as "granola type" bars. They may be used to produce a "cookie chip chocolate" product: (a) by incorporating the cookie chips or bits into molten chocolate in a mold and then solidifying the chocolate, (b) by pouring molten chocolate over the bits in a mold, or (c) by enrobing individual or a plurality of bits with melted chocolate. The cookie chips may, for example, have a maximum dimension of about ⅛" to about ¼". The amount of the cookie bits incorporated into the product may, for example, be from about 10% by weight to about 90% by weight, based upon the weight of the cookie chip chocolate product. The leavened cookie-like pieces or bits also may be: (a) ground into crumbs for use in pie crusts, for example or, (b) compacted, in a mold for example, to produce unitary cookie products.

The unleavened dough bits may also be compacted in a mold to obtain a unitary product which may be subsequently leavened. Bits having different sizes and/or compositions may be combined in the mold to produce the unitary products.

Filled products may be produced in accordance with the present invention by coextruding the dough-like mixture with filler materials. The coextrudate may be formed by the use of a concentric die or a tube inserted within the die orifice. Filled products may also be produced by transporting the dough-like mixture extrudate to a conventional enrobing or encrusting machine, such as produced by the Rheon Manufacturing Company for post extrusion filling with a filler material.

Examples of fillers which may be used include chocolate, vanilla, butterscotch, fruit, peanut butter, and cheese-flavored fillings. The filling material may also be a separately produced dough-like mixture for the production of multi-flavored, multi-colored, or multi-textured cookie products.

The extrudate pieces are leavened and further browned using: (a) electromagnetic radiation or electronic heating, such as dielectric radio frequency heating, microwave heating, or infrared heating, (b) heated air, such as from a convection oven or fluidized bed heater, (c) frying, or (d) combinations thereof. For example, a combination may comprise microwave heating or dielectric radio frequency heating for internal heating and infrared heating for more intense surface heating. The microwave, infrared, and radio frequency energy may be applied at pressures of from about 0.2 bars to about 6 bars.

When applying dielectric heating, the low conductive food product to be heated is placed between electrodes, which act as capacitor plates, and forms the dielectric of one or more capacitors. A high frequency voltage is applied across the electrodes. Alternating of the electrostatic field or of the polarity of the voltage results in heating of the product.

The frequencies generally used for dielectric heating are about 2 to 90 MHz, e.g. about 13–14 MHz, about 27 MHz, or about 40–41 MHz. The frequencies generally used for microwave heating are, for example, about 2,450 MHz for domestic ovens and about 896 to 915 MHz for industrial ovens.

The heating of the pieces in the dielectric or radio frequency oven, microwave oven, or combinations thereof, or in a fryer is generally performed so that proper leavening and browning is achieved, for example, within about 90 seconds, preferably within about 60 seconds, depending upon the thickness and diameter of the pieces. Infrared heating, conductive heating, and hot air heating are generally conducted within about two to three minutes. Infrared heating should generally be performed subsequent to another form of post extrusion heating. It tends to heat the surface and form a skin which prevents leavening gases from escaping. Generally, the heating of the pieces or cookie preforms in the post extrusion oven should be sufficient to result in an internal temperature of at least about 160° F., preferably at least about 190 F. in the cookie.

Dielectric radio frequency ovens, microwave ovens, infrared ovens, hot air ovens, and the like which may be used are conventional, industrial scale continuous throughput ovens. Continuous, conventional fryers may also be used in embodiments of the present invention. Conductive heating devices which may be used include waffle-type conductive heaters.

The post extrusion heated leavened products of the present invention have a water activity of less than about 0.7, preferably less than about 0.6. The water content of the products is generally less than about 6% by weight, suitably from about 2% by weight to about 4% by weight, based upon the weight of the post extrusion baked product, exclusive of inclusions. The products exhibit a cookie crumb-like structure appearance, and texture and structural integrity. Starch gelatinization (measured by differential scanning calorimetry) for the cookie products of the present invention is generally less than about 5%.

In the process of the present invention, a cooker extruder having two screws is preferably utilized. Preferably the screws of the extruder will be co-rotating, i.e., rotate in the same direction. Co-rotating twin screw elements, generally provide thorough mixing and conveying of the components, with the elements of one screw continuously wiping the other screw. This is particularly advantageous when the composition being mixed has a relatively high viscosity. Suitable extruders which may be used in the present invention include: (1) WENGER model series TX by Wenger of Sabetha, Kansas, (2) model series MPF by Baker Perkins, (3) model series BC by Creusot Loire of Paris, France, and preferably (4) model series ZSK or Continua by Werner and Pfleiderer. Single screw extruders including those with a horizontally oscillating screw during rotation (i.e. a Buss kneader by Buss of Pratteln, Switzerland) may also be used in accordance with the present invention.

A preferred screw configuration which may be used in the present invention with a Werner and Pfleiderer model ZSK-57 twin screw cooker extruder is disclosed in copending U.S. patent application Ser. No. 362,375 entitled "Extruder Apparatus For Producing An At Least Partially Baked Product Having A Cookie-Like Crumb Structure," filed in the name of Bernhard Van Lengerich on June 7, 1989. The disclosure of the latter application is incorporated herein by reference in its entirety.

The extruder throughput or mass flow rates utilized in the present invention with a Werner and Pfleiderer ZSK 57 twin screw cooker extruder are generally from about 150 lbs/hr to about 850 lbs/hr of extrudate. Higher rates may be achieved with other models. For example, a throughput rate of 6000 lbs/hr may be achieved using a Werner and Pfleiderer model Continua 120 cooker extruder.

The present invention is further illustrated in the following examples where all parts, ratios, and percentages are by weight and all temperatures are in °F., unless otherwise stated:

EXAMPLE 1

The ingredients, their feed placement, and their relative amounts used to prepare and extruded, partially baked cookie preform suitable for leavening into a cooking having a crumb-like structure and texture using dielectric radio frequency heating in accordance with the present invention were:

| INGREDIENT AND PLACEMENT | WEIGHT % |
|---|---|
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: first dry feed port | |
| White sugar (sucrose), granulated | 14.72 |
| Brown sugar (about 89% sucrose, 3% invert, 4% non-sugar solids, 3% water) | 6.86 |
| Vanilla | 1.23 |
| Sodium bicarbonate | 0.25 |
| Component 3: first liquid feed port | |
| Soybean spray oil | 22.56 |
| Component 4: second liquid feed port | |
| Tap water | 2.25 |
| Total | 100.00 |

The co-rotating twin screw cooker extruder used to prepare the cookie products of the present invention was a Werner and Pfleiderer ZSK-57 equipped with a screw configuration as shown and described in copending U.S. patent application Ser. No. 362,375 entitled "Extruder Apparatus For Producing An At Least Partially Baked Product Having A Cookie-Like Crumb Structure," filed in the name of Bernhard Van Lengerich on June 7, 1989. The extruder had twelve barrels, each provided with external, jacketed heating and cooling means. First and second dry feed ports were set up at barrels 1 and 8, respectively. These two dry feed ports were open to the atmosphere. The first liquid feed port was set up between barrels 1 and 2. The second liquid feed port was the same as the second dry feed port at barrel 8. The second liquid feed inlet pipe was inserted into the open port at barrel 8 so that optional second dry feed ingredients and the second liquid feed ingredients could be separately fed into the same port. Dry ingredients were not fed to the second dry feed port in this example.

The first barrel, which contained the first dry feed port, was set on constant cool. The remaining eleven barrels were divided into 7 separately measured barrel temperature zones. Barrels 2 and 3 corresponded to temperature zone 1, barrel 4 corresponded to zone 2, barrels 5 and 6 corresponded to zone 3, barrels 7 and 8 corresponded to zones 4, and 5, respectively, barrels 9 and 10 corresponded to temperature zone 6, and barrels 11 and 12 corresponded to temperature zone 7. The thermocouples for measuring actual barrel temperatures were located in barrels 2, 4, 5, 7, 8, 10, and 12.

Barrels 2 through 6 were set to heat to 350° F., barrel seven to 200° F., barrel eight was set on constant cool (less than 100° F.), barrels 9 and 10 were set at 100° F. and barrels 11 and 12 were set at 110° F.

Paddles and screw elements were arranged on the screw shafts from upstream to downstream to provide: a) rapid conveying of the added dry ingredients in barrel 1, (b) conveying of the dry ingredients and added oil and gradually increasing the degree of fill in barrel 2, (c) chopping or mixing action for admixing the oil and dry ingredients, conveying to gradually increase the degree of fill, and mixing in barrel 3, (d) repeated conveying and an increased degree of mixing in barrel 4, (e) increased mixing, conveying and increased mixing to gradually increase the degree of fill in each of barrels 5 and 6, (f) increased mixing, conveying, and increased mixing to provide the highest degree of mixing in barrel 7, (g) fast conveying of the ingredients fed to the port in barrel 8, (h) conveying with a gradual increase in degree of fill in barrel 9, (i) conveying and mixing with a gradual increase in degree of fill in barrel 10, (j) conveying and mixing in barrel 11, and (k) conveying with a buildup in pressure sufficient to extrude the dough-like mixture through the extruder die. Gradually increasing the degree of fill tends to reduce points of high pressure which may cause oil separation.

The screws were rotated at about 125 rpm at about 3% of maximum torque. The ingredients were fed in their relative amounts to provide a throughput or mass flow rate of the dough-like mixture extrudate of about 201 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed to the first dry feed port, but separate from component 1. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
| --- | --- | --- |
| 1 | cool | — |
| 2 | 350 | 247 |
| 3 | 350 | — |
| 4 | 350 | 302 |
| 5 | 350 | 333 |
| 6 | 350 | — |
| 7 | 200 | 198 |
| 8 | <100 | 98 |
| 9 | 100 | — |
| 10 | 100 | 105 |
| 11 | 110 | — |
| 12 | 110 | 113 |

The pressure in the extruder was less than about 10 bars. The material temperatures in the extruder were about 231° F. at barrel 7, and about 137° F. at barrel 12. The average or median residence time of the ingredients heated prior to addition of component 4 at the second feed port was about 40-50 seconds. The average or median residence time of the ingredients in the extruder from the second feed port was about 10 to 20 seconds.

The substantially homogeneous dough-like mixture formed in the extruder was extruded through a horizontally oriented slit die (about 5 mm high by about 50 mm wide) to obtain a continuous, substantially unleavened ribbon. The extrudate temperature upon exiting the extruder was about 151° F. The ribbon was cut into cylindrical pieces by hand, using a cookie cutter. The diameter of the pieces was about 1¼".

The pieces were subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 2

The ingredients, their feed placement, and their relative amounts which may be used to prepare an extruded, partially baked cookie preform suitable for leavening into a cookie having a crumb-like structure and texture using dielectric radio frequency heating in accordance with the present invention are:

| INGREDIENT AND PLACEMENT | WEIGHT % |
| --- | --- |
| Component 1: first dry feed port | |
| Wheat flour, bleached (about 12% by weight water) | 55.00 |
| Non-fat dry milk (about 52% by weight lactose) | 1.65 |
| Salt | 0.83 |
| White sugar (sucrose), granulated | 8.80 |
| Component 2: second dry feed port | |
| Brown sugar (about 89% sucrose, 3% invert, 4% non-sugar solids, 3% water) | 3.85 |
| Aspartame | 0.06 |
| Component 3: first liquid feed port | |
| Soybean spray oil | 24.75 |
| Component 4: second liquid feed port | |
| Tap water | 5.06 |
| Total | 100.00 |

The co-rotating twin screw cooker extruder system of Example 1 may be used to prepare the cookie products of the present invention.

The screws may be rotated at about 225 rpm at about 8% of maximum torque. The ingredients may be fed in their relative amounts to provide a throughput or mass flow rate of the dough-like mixture extrudate of about 181 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 11.8% by weight, based upon the total weight of the dough-like mixture.

The barrel set temperatures, pressures, and residence times may be the same as in Example 1.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1 and ¼"

The pieces having an average weight of about 4.2 gm/piece may be subjected to heating in a continuous 12 kw dielectric radio frequency (27 MHz) oven set at about 81% power for 45 seconds to produce distinctly leavened, surface browned cookies having a crumb-like structure and crumb-like texture.

EXAMPLE 3

The ingredients, their feed placement, and their relative amounts which may be used to prepare an extruded, partially baked cookie preform suitable for leavening into a cookie having a crumb-like structure and texture using dielectric radio frequency heating in accordance with the present invention are:

| INGREDIENT AND PLACEMENT | WEIGHT % |
| --- | --- |
| Component 1: first dry feed port | |
| Wheat flour, bleached (about 12% by weight water) | 24.67 |
| Oat bran (about 12% by weight water) | 24.67 |
| Non-fat dry milk (about 52% by weight lactose) | 1.48 |
| Salt | 0.74 |
| White sugar (sucrose), granulated | 14.80 |
| Component 2: second dry feed port | |
| Brown sugar (about 89% sucrose, 3% invert, 4% non-sugar solids, 3% water) | 6.91 |
| Component 3: first liquid feed port | |
| Soybean spray oil | 22.20 |
| Component 4: second liquid feed port | |
| Tap water | 4.53 |
| Total | 100.00 |

The co-rotating twin screw cooker extruder system of Example 1 may be used to prepare the cookie products of the present invention.

The screws may be rotated at about 225 rpm at about 5% of maximum torque. The ingredients may be fed in their relative amounts to provide a throughput or mass flow rate of the dough-like mixture extrudate of about 203 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 10.7% by weight, based upon the total weight of the dough-like mixture.

The barrel set temperatures, pressures, and residence times may be the same as in Example 1.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1 and ¼".

The pieces having an average weight of about 4.2 gm/piece may be subjected to heating in a continuous 12 kw dielectric radio frequency (27 MHz) oven set at about 81% power for 45 seconds to produce distinctly leavened, surface browned cookies having a crumb-like structure and crumb-like texture.

EXAMPLE 4

The ingredients, their feed placement and their relative amounts which may be used to prepare an extruded, partially baked cookie preform suitable for leavening into a cookie having a crumb-like structure and texture using dielectric radio frequency heating in accordance with the present invention are:

| INGREDIENT AND PLACEMENT | WEIGHT % |
| --- | --- |
| Component 1: first dry feed port | |
| Wheat flour, bleached (about 12% by weight water) | 45.72 |
| Non-fat dry milk (about 52% by weight lactose) | 1.37 |
| Salt | 0.69 |
| White sugar (sucrose), granulated | 13.72 |
| Component 2: second dry feed port | |
| Brown sugar (about 89% sucrose, 3% invert, 4% non-sugar solids, 3% water) | 6.40 |
| Nut pieces (walnut fluff) | 7.31 |
| Component 3: first liquid feed port | |
| Soybean spray oil | 20.58 |
| Component 4: second liquid feed port | |
| Tap water | 4.21 |
| Total | 100.00 |

The co-rotating twin screw cooker extruder system of Example 1 may be used to prepare the cookie products of the present invention.

The screws may be rotated at about 225 rpm at about 5% of maximum torque. The ingredients may be fed in their relative amounts to provide a throughput or mass flow rate of the dough-like mixture extrudate of about 218 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 10.7% by weight, based upon the total weight of the dough-like mixture.

The barrel set temperatures, pressures, and residence times may be the same as in Example 1.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1 and ¼".

The pieces having an average weight of about 4.2 gm/piece may be subjected to heating in a continuous 12 kw dielectric radio frequency (27 MHz) oven set at about 81% power for 45 seconds to produce distinctly leavened, surface browned cookies having a crumb-like structure and crumb-like texture.

EXAMPLE 5

The ingredients, their feed placement, and their relative amounts used to prepare an extruded, partially baked cookie preform suitable for leavening into a cookie having a crumb-like structure and texture using dielectric radio frequency heating in accordance with the present invention were:

| INGREDIENT AND PLACEMENT | WEIGHT % |
|---|---|
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: first dry feed port | |
| White sugar (sucrose), granulated | 15.64 |
| Brown sugar (about 89% sucrose, 3% invert, 4% non-sugar solids, 3% water) | 7.29 |
| Vitamin mix | 0.13 |
| Component 3: first liquid feed port | |
| Soybean spray oil | 22.56 |
| Component 4: second liquid feed port | |
| Tap water | 2.25 |
| Total | 100.00 |

The co-rotating twin screw cooker extruder system of Example 1 was used to prepare the cookie products of the present invention.

The screws were rotated at about 125 rpm at about 3% of maximum torque. The ingredients were fed in their relative amounts to provide a throughput or mass flow rate of the dough-like mixture extrudate of about 203 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed to the first dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature °F. | Actual Barrel Temperature °F. |
|---|---|---|
| 1 | cool | — |
| 2 | 350 | 235 |
| 3 | 350 | — |
| 4 | 350 | 281 |
| 5 | 350 | 341 |
| 6 | 350 | — |
| 7 | 200 | 199 |
| 8 | <100 | 92 |
| 9 | 100 | — |
| 10 | 100 | 104 |
| 11 | 110 | — |
| 12 | 110 | 125 |

The pressure in the extruder was less than about 10 bars. The material temperatures in the extruder were about 231° F. at barrel 7, and about 143° F. at barrel 12. The average or median residence time of the ingredients heated prior to addition of component 4 at the second feed port was about 40-50 seconds. The average or median residence time of the ingredients in the extruder from the second feed port was about 10 to 20 seconds.

The substantially homogeneous dough-like mixture formed in the extruder was extruded through a horizontally oriented slit die (about 5 mm high by about 50 mm wide) to obtain a continuous, substantially unleavened ribbon. The extrudate temperature upon exiting the extruder was about 142° F. The ribbon was cut into cylindrical pieces by hand, using a cookie cutter. The diameter of the pieces was about 1¼".

The pieces were subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 6

The ingredients, their feed placement, and their relative amounts which may be used to prepare an extruded, partially baked cookie preform suitable for leavening into a cookie having a crumb-like structure and texture using dielectric radio frequency heating in accordance with the present invention are:

| INGREDIENT AND PLACEMENT | WEIGHT % |
|---|---|
| Component 1: first dry feed port | |
| Wheat flour, bleached (about 12% by weight water) | 48.43 |
| Non-fat dry milk (about 52% by weight lactose) | 1.45 |
| Salt | 0.73 |
| Component 2: first dry feed port | |
| White sugar (sucrose), granulated | 14.53 |
| Brown sugar (about 89% sucrose, 3% invert, 4% non-sugar solids, 3% water) | 6.78 |
| Component 3: first liquid feed port | |
| Soybean spray oil | 24.21 |
| Component 4: second liquid feed port | |
| Tap water | 3.87 |
| Total | 100.00 |

The co-rotating twin screw cooker extruder system of Example 1 may be used to prepare the cookie products of the present invention.

The screws may rotated at about 125 rpm at about 2% of maximum torque. The ingredients may be fed in their relative amounts to provide a throughput or mass flow rate of the dough-like mixture extrudate f about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed to the first dry feed port, but separate from component 1. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 10.7% by weight, based upon the total weight of the dough-like mixture.

The barrel set temperatures, pressures, and residence times may be the same as in Example 1:

The substantially homogeneous dough-like mixture formed in the extruder may be extruded without a die to obtain a substantially unleavened extrudate dough having a temperature upon exiting the extruder of less than about 150° F. The extrudate may be transferred or drop into the hopper of a conventional cookie wire-cutting machine. The wire-cutting machine may be equipped with a screw-type or auger feed or counter-rotating grooved rollers for feeding the extrudate through nozzles. Upon emerging through the nozzles, the extrudate is cut into cylindrical pieces by the wire. The pieces may be subjected to heating in a continuous 12 kw dielectric radio frequency (27 MHz) oven set at about 81% power for 45 seconds to produce distinctly leavened, surface browned cookies having a crumb-like structure and crumb-like texture.

EXAMPLE 7

The ingredients, their feed placement, and their relative amounts used to prepare an extruded, partially baked cookie preform suitable for leavening into a cookie having a crumb-like structure and texture using dielectric radio frequency heating in accordance with the present invention were:

| INGREDIENT AND PLACEMENT | WEIGHT % |
|---|---|
| Component 1: first dry feed port | |
| Wheat flour, bleached (about 12% by weight water) | 48.09 |
| Non-fat dry milk (about 52% by weight lactose) | 1.44 |
| Salt | 0.74 |
| Component 2: first dry feed port | |
| White sugar (sucrose), granulated | 14.47 |
| Brown sugar (about 89% sucrose, 3% invert, 4% non-sugar solids, 3% water) | 6.76 |
| Sodium bicarbonate | 1.21 |
| Component 3: first liquid feed port | |
| Soybean spray oil | 24.15 |
| Component 4: second liquid feed port | |
| Tap water | 3.14 |
| Total | 100.00 |

The co-rotating twin screw cooker extruder system of Example 1 was used to prepare the cookie products of the present invention.

The screws were rotated at about 125 rpm at about 3% of maximum torque. The ingredients were fed in their relative amounts to provide a throughput or mass flow rate of the dough-like mixture extrudate of about 414 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed to the first dry feed port but separate from component 1. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 9.1% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 209 |
| 3 | 350 | — |
| 4 | 350 | 265 |
| 5 | 350 | 274 |
| 6 | 350 | — |
| 7 | 200 | 198 |
| 8 | cool | 98 |
| 9 | 100 | — |
| 10 | 100 | 99 |
| 11 | 120 | — |
| 12 | 120 | 124 |

The pressure in the extruder was less than about 10 bars. The average or median residence time of the ingredients heated prior to addition of component 4 at the second feed port was about 40–50 seconds. The average or median residence time of the ingredients in the extruder from the second feed port was about 10 to 20 seconds. The substantially homogeneous dough-like mixture formed in the extruder was extruded through a horizontally oriented slit die (about 5 mm high by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

The pieces may be subjected to heating in a continuous 12 kw dielectric radio frequency (27 MHz) oven set at about 81% power for about 45 seconds to produce distinctly leavened surface browned cookies having a crumb-like structure and crumb-like texture.

EXAMPLE 8

The ingredients, their feed placement, and their relative amounts which may be used to prepare an extruded, partially baked cookie preform suitable for leavening into a cookie having a crumb-like structure and texture using dielectric radio frequency heating in accordance with the present invention are:

| INGREDIENT AND PLACEMENT | WEIGHT % |
|---|---|
| Component 1: first dry feed port | |
| Oat Bran (about 12% by weight water) | 48.31 |
| White sugar (sucrose), granulated | 14.02 |
| Component 2: second dry feed port | |
| Brown sugar (about 89% sucrose, 3% invert, 4% non-sugar solids, 3% water) | 6.56 |
| Component 3: first liquid feed port | |
| Soybean spray oil | 21.73 |
| Component 4: second liquid feed port | |
| Sodium Bicarbonate | 1.17 |
| Tap water | 8.21 |
| Total | 100.00 |

The co-rotating twin screw cooker extruder system of Example 1 may be used to prepare the cookie products of the present invention.

The screws may be rotated at about 145 rpm at about 1% of maximum torque. The ingredients may be fed in their relative amounts to provide a throughput or mass flow rate of the dough-like mixture extrudate of about 207 lbs/hr.

Component 1 may be prepared by mixing the ingredients to obtain a substantially homogeneous dry blend. The component 1 dry blend may be continuously fed to the first dry feed port. Component 2 may be continuously fed downstream to the second dry feed port. Component 3 may be prepared by melting the semi-solid soybean spray oil to obtain a liquid oil which may be continuously fed to the first liquid feed port. Component 4 may be prepared by dissolving the sodium bicarbonate in the water to form a solution which may be continuously fed to the second liquid feed port.

On a calculated basis, the water content of the dough-like mixture formed in the extruder is about 14.2% by weight, based upon the total weight of the dough-like mixture.

The barrel set temperatures, pressures, and residence times may be the same as in Example 1.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1 and ¼".

The pieces may be subjected to heating in a continuous 12 kw dielectric radio frequency (27 MHz) oven set at about 81% power for 45 seconds to produce distinctly leavened, surface browned cookies having a crumb-like structure and crumb-like texture.

EXAMPLE 9

The ingredients, their feed placement, and their relative amounts used to prepare a cookie having a crumb-like structure and texture using extrusion heating and dielectric radio frequency baking in accordance with the present invention were:

| INGREDIENT AND PLACEMENT | WEIGHT % |
|---|---|
| Component 1: first dry feed port | |
| Wheat flour, bleached (about 12% by weight water) | 49.08 |
| Non-fat dry milk (about 52% by weight lactose) | 1.48 |
| Salt | 0.74 |
| Component 2: second dry feed port | |
| White sugar (sucrose), granulated | 15.13 |
| Brown sugar (about 89% sucrose, 3% invert, 4% non-sugar solids, 3% water) | 7.06 |
| Component 3: first liquid feed port | |
| Soybean spray oil | 24.66 |
| Component 4: second liquid feed port | |
| Sodium bicarbonate | 0.17 |
| Tap water | 1.68 |
| Total | 100.00 |

The co-rotating twin screw cooker extruder used to prepare the cookie products of the present invention was a Werner and Pfleiderer ZSK-57 equipped with a screw configuration as shown and described in copending U.S. patent application Ser. No. 362,375 entitled "Extruder Apparatus For Producing An At Least Partially Baked Product Having A Cookie-Like Crumb Structure," filed in the name of Bernhard Van Lengerich on June 7, 1989. The extruder had twelve barrels, each provided with external, jacketed heating and cooling means. The first and second dry feed ports were set up at barrels 1 and 8, respectively. These two dry feed ports were open to the atmosphere. The first liquid feed port was set up between barrels 1 and 2. The second liquid feed port was the same as the second dry feed port at barrel 8. The second liquid feed inlet pipe was inserted into the open port at barrel 8 so that the second dry feed ingredients and the second liquid feed ingredients were separately fed into the same port.

The first barrel, which contained the first dry feed port, was set on constant cool. The remaining eleven barrels were divided into 7 separately measured barrel temperature zones. Barrels 2 and 3 corresponded to temperature zone 1, barrel 4 corresponded to zone 2, barrels 5 and 6 corresponded to zone 3, barrels 7 and 8 corresponded to zones 4, and 5, respectively, barrels 9 and 10 corresponded to temperature zone 6, and barrels 11 and 12 corresponded to temperature zone 7. The thermocouples for measuring actual barrel temperatures were located in barrels 2, 4, 5, 7, 8, 10, and 12.

Barrels 2 through 6 were set to heat to 350° F., barrel seven to 200° F., barrel eight was set on constant cool, barrels 9 and 10 were set at 100° F. and barrels 11 and 12 were set at 120° F.

Paddles and screw elements were arranged on the screw shafts from upstream to downstream to provide: (a) rapid conveying of the added dry ingredients in barrel 1, (b) conveying of the dry ingredients and added oil and gradually increasing the degree of fill in barrel 2, (c) chopping or mixing action for admixing the oil and dry ingredients, conveying to gradually increase the degree of fill, and mixing in barrel 3, (d) repeated conveying and an increased degree of mixing in barrel 4, (e) increased mixing, conveying and increased mixing to gradually increase the degree of fill in each of barrels 5 and 6, (f) increased mixing, conveying, and increased mixing to provide the highest degree of mixing in barrel 7, (g) fast conveying of the dry and liquid ingredients fed to the port in barrel 8, (h) conveying with a gradual increase in degree of fill in barrel 9, (i) conveying and mixing with a gradual increase in degree of fill in barrel 10, (j) conveying and mixing in barrel 11, and (k) conveying with a buildup in pressure sufficient to extrude the dough-like mixture through the extruder die. Gradually increasing the degree of fill tends to reduce points of high pressure which may cause oil separation.

The screws were rotated at about 125 rpm at about 2% of maximum torque. The ingredients were fed in their relative amounts to provide a throughput or mass flow rate of the dough-like mixture extrudate of about 405 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was prepared by dissolving the sodium bicarbonate in the water to form a solution which was continuously fed to the second liquid feed port.

On a calculated basis, the water content of the dough-like mixture formed in the extruder was about 7.8% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
| --- | --- | --- |
| 1 | cool | — |
| 2 | 350 | 206 |
| 3 | 350 | — |
| 4 | 350 | 245 |
| 5 | 350 | 324 |
| 6 | 350 | — |
| 7 | 200 | 201 |
| 8 | cool | <100 |
| 9 | 100 | — |
| 10 | 100 | <100 |
| 11 | 120 | — |
| 12 | 120 | 115 |

The pressure in the extruder was less than about 10 bars. The average or median residence time of the ingredients heated prior to addition of components 2 and 4 at the second feed ports was about 40-50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

The pieces were subjected to radio frequency energy (27 MHz) in a 12 kw dielectric oven set at 81% power for about 45 seconds to produce distinctly leavened cookies. The cookies were surface browned and had a crumb-like structure and crumb-like texture.

EXAMPLE 10

The ingredients, their feed placement, and their relative amounts used to prepare an extruded, partially baked cookie preform suitable for leavening into a cookie having a crumb-like structure and texture using dielectric radio frequency heating in accordance with the present invention were:

| INGREDIENT AND PLACEMENT | WEIGHT % |
| --- | --- |
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: second dry feed port | |
| White sugar (sucrose), granulated | 14.72 |
| Brown sugar (about 89% sucrose, 3% invert, 4% non-sugar solids, 3% water) | 6.86 |
| Vanilla | 1.23 |
| Sodium bicarbonate | 0.25 |
| Component 3: first liquid feed port | |
| Soybean spray oil | 22.56 |
| Component 4: second liquid feed port | |
| Tap water | 2.25 |
| Total | 100.00 |

The co-rotating twin screw cooker extruder system of Example 9 was used to prepare the cookie products of the present invention.

The screws were rotated at about 125 rpm at about 2% of maximum torque. The ingredients were fed in their relative amounts to provide a throughput or mass flow rate of the dough-like mixture extrudate of about 200 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
| --- | --- | --- |
| 1 | cool | — |
| 2 | 350 | 247 |
| 3 | 350 | — |
| 4 | 350 | 307 |
| 5 | 350 | 309 |
| 6 | 350 | — |
| 7 | 200 | 201 |
| 8 | <100 | 122 |
| 9 | 100 | — |
| 10 | 100 | 99 |
| 11 | 110 | — |
| 12 | 110 | 112 |

The pressure in the extruder was less than about 10 bars. The material temperatures in the extruder were about 230° F. at barrel 7, and about 131° F. at barrel 12. The average or median residence time of the ingredients heated prior to addition of components 2 and 4 at the second feed ports was about 40-50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was about 125° F. The ribbon was cut into cylindrical pieces by hand, using a cookie cutter. The diameter of the pieces was about 1¼".

The pieces may be subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 11

The ingredients, their feed placement, and their relative amounts used to prepare an extruded, partially baked cookie preform suitable for leavening into a cookie having a crumb-like structure and texture using dielectric radio frequency heating in accordance with the present invention were:

| INGREDIENT AND PLACEMENT | WEIGHT % |
|---|---|
| Component 1: first dry feed port | |
| Wheat flour, bleached (about 12% by weight water) | 48.66 |
| Non-fat dry milk (about 52% by weight lactose) | 1.46 |
| Salt | 0.73 |
| Component 2: second dry feed port | |
| White sugar (sucrose), granulated | 14.60 |
| Brown sugar (about 89% sucrose, 3% invert, 4% non-sugar solids, 3% water) | 6.81 |
| Sodium bicarbonate | 1.22 |
| Component 3: first liquid feed port | 24.33 |
| Soybean spray oil | |
| Component 4: second liquid feed port | 2.19 |
| Tap water | |
| Total | 100.00 |

The co-rotating twin screw cooker extruder system of Example 9 was used to prepare the cookie products of the present invention.

The screws were rotated at about 125 rpm at about 2% of maximum torque. The ingredients were fed in their relative amounts to provide a throughput or mass flow rate of the dough-like mixture extrudate of about 405 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.2% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 206 |
| 3 | 350 | — |
| 4 | 350 | 245 |
| 5 | 350 | 324 |
| 6 | 350 | — |
| 7 | 200 | 201 |
| 8 | cool | <100 |
| 9 | 100 | — |
| 10 | 100 | <100 |
| 11 | 120 | — |
| 12 | 120 | 115 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

The pieces may be subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 12

The ingredients, their feed placement, and their relative amounts used to prepare an extruded, partially baked cookie preform suitable for leavening into a cookie having a crumb-like structure and texture using dielectric radio frequency heating in accordance with the present invention were:

| INGREDIENT AND PLACEMENT | WEIGHT % |
|---|---|
| Component 1: first dry feed port | |
| Wheat flour, bleached (about 12% by weight water) | 55.00 |
| Non-fat dry milk (about 52% by weight lactose) | 1.65 |
| Salt | 0.83 |
| Component 2: second dry feed port | |
| White sugar (sucrose), granulated | 8.80 |
| Brown sugar (about 89% sucrose, 3% invert, 4% non-sugar solids, 3% water) | 3.85 |
| Aspartame | 0.06 |
| Component 3: first liquid feed port | 24.75 |
| Clarified butter | |
| Component 4: second liquid feed port | 5.06 |
| Tap water | |
| Total | 100.00 |

The co-rotating twin screw cooker extruder system of Example 9 was used to prepare the cookie products of the present invention.

The screws were rotated at about 225 rpm at about 8% of maximum torque. The ingredients were fed in their relative amounts to provide a throughput or mass flow rate of the dough-like mixture extrudate of about 181 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid clarified butter to obtain a liquid oil which was continuously fed to the first liquid feed port. Component 4 was continuously fed to the second liquid feed port.

On a calculated basis, the water content of the dough-like mixture formed in the extruder was about 11.8% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 298 |

-continued

| Barrel # | Barrel Set Temperature, °F. | Actual Barrel Temperature, °F. |
|---|---|---|
| 3 | 350 | — |
| 4 | 350 | 335 |
| 5 | 350 | 290 |
| 6 | 350 | — |
| 7 | 200 | 195 |
| 8 | cool | 100 |
| 9 | 100 | — |
| 10 | 100 | 100 |
| 11 | 120 | — |
| 12 | 120 | 119 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150 F. The ribbon was cut into cylindrical pieces by hand, using a cookie cutter. The diameter of the pieces was about 1 ¼".

The pieces may be subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 13

The ingredients, their feed placement, and their relative amounts used to prepare an extruded, partially baked cookie preform suitable for leavening into a cookie having a crumb-like structure and texture using dielectric radio frequency heating in accordance with the present invention were:

| INGREDIENT AND PLACEMENT | WEIGHT % |
|---|---|
| Component 1: first dry feed port | |
| Wheat flour, bleached (about 12% by weight water) | 24.67 |
| Oat bran (about 12% by weight water) | 24.67 |
| Non-fat dry milk (about 52% by weight lactose) | 1.48 |
| Salt | 0.74 |
| Component 2: second dry feed port | |
| White sugar (sucrose), granulated | 14.80 |
| Brown sugar (about 89% sucrose, 3% invert, 4% non-sugar solids, 3% water) | 6.91 |
| Component 3: first liquid feed port | 22.20 |
| Clarified butter | |
| Component 4: second liquid feed port | |
| Sodium bicarbonate | 0.41 |
| Tap water | 4.12 |
| Total | 100.00 |

The co-rotating twin screw cooker extruder system of Example 9 was used to prepare the cookie products of the present invention.

The screws were rotated at about 225 rpm at about 5% of maximum torque. The ingredients were fed in their relative amounts to provide a throughput or mass flow rate of the dough-like mixture extrudate of about 203 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid clarified butter to obtain a liquid oil which was continuously fed to the first liquid feed port. Component 4 was prepared by dissolving the sodium bicarbonate in the water to form a solution which was continuously fed to the second liquid feed port.

On a calculated basis, the water content of the dough-like mixture formed in the extruder was about 10.2% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 276 |
| 3 | 350 | — |
| 4 | 350 | 311 |
| 5 | 350 | 289 |
| 6 | 350 | — |
| 7 | 200 | 198 |
| 8 | cool | 100 |
| 9 | 100 | — |
| 10 | 100 | 100 |
| 11 | 120 | — |
| 12 | 120 | 122 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

The pieces may be subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 14

The ingredients, their feed placement, and their relative amounts used to prepare an extruded, partially baked cookie preform suitable for leavening into a cookie having a crumb-like structure and texture using dielectric radio frequency heating in accordance with the present invention were:

| INGREDIENT AND PLACEMENT | WEIGHT % |
|---|---|
| Component 1: first dry feed port | |

-continued

| INGREDIENT AND PLACEMENT | WEIGHT % |
|---|---|
| Wheat flour, bleached (about 12% by weight water) | 45.72 |
| Non-fat dry milk (about 52% by weight lactose) | 1.37 |
| Salt | 0.69 |
| *Component 2: second dry feed port* | |
| White sugar (sucrose), granulated | 13.72 |
| Brown sugar (about 89% sucrose, 3% invert, 4% non-sugar solids, 3% water) | 6.40 |
| Nut pieces (walnut fluff) | 7.31 |
| *Component 3: first liquid feed port* | |
| Clarified butter | 20.58 |
| *Component 4: second liquid feed port* | |
| Sodium bicarbonate | 0.38 |
| Tap water | 3.83 |
| Total | 100.00 |

The co-rotating twin screw cooker extruder system of Example 9 was used to prepare the cookie products of the present invention.

The screws were rotated at about 225 rpm at about 5% of maximum torque. The ingredients were fed in their relative amounts to provide a throughput or mass flow rate of the dough-like mixture extrudate of about 218 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid clarified butter to obtain a liquid oil which was continuously fed to the first liquid feed port. Component 4 was prepared by dissolving the sodium bicarbonate in the water to form a solution which was continuously fed to the second liquid feed port.

On a calculated basis, the water content of the dough-like mixture formed in the extruder was about 10.3% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 276 |
| 3 | 350 | — |
| 4 | 350 | 311 |
| 5 | 350 | 289 |
| 6 | 350 | — |
| 7 | 200 | 198 |
| 8 | cool | 100 |
| 9 | 100 | — |
| 10 | 100 | 100 |
| 11 | 120 | — |
| 12 | 120 | 122 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

The pieces may be subjected to heating in a continuous 12 kw dielectric radio frequency (27 MHz) oven set at about 81% power for 45 seconds to produce distinctly leavened, surface browned cookies having a crumb-like structure and crumb-like texture.

EXAMPLE 15

The ingredients, their feed placement, and their relative amounts used to prepare an extruded, partially baked cookie preform suitable for leavening into a cookie having a crumb-like structure and texture using dielectric radio frequency heating in accordance with the present invention were:

| INGREDIENT AND PLACEMENT | WEIGHT % |
|---|---|
| *Component 1: first dry feed port* | |
| Wheat flour, bleached (about 12% by weight water) | 49.88 |
| Non-fat dry milk (about 52% by weight lactose) | 1.50 |
| Salt | 0.75 |
| *Component 2: second dry feed port* | |
| White sugar (sucrose), granulated | 15.64 |
| Brown sugar (about 89% sucrose, 3% invert, 4% non-sugar solids, 3% water) | 7.29 |
| Vitamin mix | 0.13 |
| *Component 3: first liquid feed port* | |
| Soybean spray oil | 22.56 |
| *Component 4: second liquid feed port* | |
| Tap water | 2.25 |
| Total | 100.00 |

The co-rotating twin screw cooker extruder system of Example 9 was used to prepare the cookie products of the present invention.

The screws were rotated at about 125 rpm at about 2% of maximum torque. The ingredients were fed in their relative amounts to provide a throughput or mass flow rate of the dough-like mixture extrudate of about 203 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 228 |
| 3 | 350 | — |
| 4 | 350 | 283 |
| 5 | 350 | 340 |
| 6 | 350 | — |
| 7 | 200 | 200 |
| 8 | <100 | 138 |
| 9 | 100 | — |
| 10 | 100 | 98 |
| 11 | 110 | — |
| 12 | 110 | 111 |

The pressure in the extruder was less than about 10 bars. The material temperatures in the extruder were about 236° F. at barrel 7, and about 135° F. at barrel 12. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was about 143° F. The ribbon was cut into cylindrical pieces by hand, using a cookie cutter. The diameter of the pieces was about 1¼".

The pieces were subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 16

The ingredients, their feed placement, and their relative amounts which may be used to prepare an extruded, partially baked cookie preform suitable for leavening into a cookie having a crumb-like structure and texture using dielectric radio frequency heating in accordance with the present invention are:

| INGREDIENT AND PLACEMENT | WEIGHT % |
|---|---|
| Component 1: first dry feed port | |
| Wheat flour, bleached (about 12% by weight water) | 48.43 |
| Non-fat dry milk (about 52% by weight lactose) | 1.45 |
| Salt | 0.73 |
| Component 2: second dry feed port | |
| White sugar (sucrose), granulated | 14.53 |
| Brown sugar (about 89% sucrose, 3% invert, 4% non-sugar solids, 3% water) | 6.78 |
| Component 3: first liquid feed port | |
| Soybean spray oil | 24.21 |
| Component 4: second liquid feed port | |
| Tap water | 3.87 |
| Total | 100.00 |

The co-rotating twin screw cooker extruder system of Example 9 may be used to prepare the cookie products of the present invention.

The screws may rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 10.7% by weight, based upon the total weight of the dough-like mixture.

The barrel set temperatures, pressures, and residence times may be the same as in Example 9.

The substantially homogeneous dough-like mixture formed in the extruder may be extruded without a die to obtain a substantially unleavened extrudate dough having a temperature upon exiting the extruder of less than about 150° F. The extrudate may be transferred or drop into the hopper of a conventional cookie wire-cutting machine. The wire-cutting machine may be equipped with a screw-type or auger feed or counter-rotating grooved rollers for feeding the extrudate through nozzles. Upon emerging through the nozzles, the extrudate is cut into cylindrical pieces by the wire. The pieces may be subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 17

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 48.09 |
| Non-fat dry milk (about 52% by weight lactose) | 1.44 |
| Salt | 0.74 |
| Component 2: first dry feed port | |
| White sugar (sucrose), granulated | 14.47 |
| Brown sugar (about 89% sucrose, 3% invert, 4% non-sugar solids, 3% water) | 6.76 |
| Sodium bicarbonate | 1.21 |
| Component 3: first liquid feed port | |
| Soybean spray oil | 24.15 |
| Component 4: second liquid feed port | |
| Tap water | 3.14 |
| Total | 100.00 |

The co-rotating twin screw cooker extruder used to prepare the cookie products of the present invention was a Werner and Pfleiderer ZSK-57 equipped with a screw configuration as shown and described in copending U.S. patent application Ser. No. 362,375 entitled "Extruder Apparatus For Producing An At Least Partially Baked Product Having A Cookie-Like Crumb Structure," filed in the name of Bernhard Van Lengerich on June 7, 1989. The extruder had twelve barrels, each provided with external, jacketed heating and cooling means. First and second dry feed ports were set up at barrels 1 and 8, respectively. These two dry feed ports were open to the atmosphere. The first liquid feed port was set up between barrels 1 and 2. The second liquid feed port was the same as the second dry feed port at barrel 8. The second liquid feed inlet pipe was inserted into the open port at barrel 8 so that optional second dry feed ingredients and the second liquid feed ingredients could be separately fed into the same port. Dry ingredients were not fed to the second dry feed port in this example.

The first barrel, which contained the first dry feed port, was set on constant cool. The remaining eleven barrels were divided into 7 separately measured barrel temperature zones. Barrels 2 and 3 corresponded to temperature zone 1, barrel 4 corresponded to zone 2, barrels 5 and 6 corresponded to zone 3, barrels 7 and 8 corresponded to zones 4, and 5, respectively, barrels 9 and 10 corresponded to temperature zone 6, and barrels 11 and 12 corresponded to temperature zone 7. The thermocouples for measuring actual barrel temperatures were located in barrels 2, 4, 5, 7, 8, 10, and 12. Barrels 2 through 6 were set to heat to 350° F., barrel seven to 200° F., barrel eight was set on constant cool, barrels 9 and 10 were set at 100° F. and barrels 11 and 12 were set at 120° F.

Paddles and screw elements were arranged on the screw shafts from upstream to downstream to provide: (a) rapid conveying of the added dry ingredients in barrel 1, (b) conveying of the dry ingredients and added oil and gradually increasing the degree of fill in barrel 2, (c) chopping or mixing action for admixing the oil and dry ingredients, conveying to gradually increase the degree of fill, and mixing in barrel 3, (d) repeated conveying and an increased degree of mixing in barrel 4, (e) increased mixing, conveying and increased mixing to gradually increase the degree of fill in each of barrels 5 and 6, (f) increased mixing, conveying, and increased mixing to provide the highest degree of mixing in barrel 7, (g) fast conveying of the ingredients fed to the port in barrel 8, (h) conveying with a gradual increase in degree of fill in barrel 9, (i) conveying and mixing with a gradual increase in degree of fill in barrel 10, (j) conveying and mixing in barrel 11, and (k) conveying with a buildup in pressure sufficient to extrude the dough-like mixture through the extruder die. Gradually increasing the degree of fill tends to reduce points of high pressure which may cause oil separation.

The screws were rotated at about 125 rpm at about 3% of maximum torque. The ingredients were fed in their relative amounts to provide a throughput or mass flow rate of the dough-like mixture extrudate of about 414 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed to the first dry feed port but separate from component 1. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 9.1% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 209 |
| 3 | 350 | — |
| 4 | 350 | 265 |
| 5 | 350 | 274 |
| 6 | 350 | — |
| 7 | 200 | 198 |
| 8 | cool | 98 |
| 9 | 100 | — |
| 10 | 100 | 99 |
| 11 | 120 | — |
| 12 | 120 | 124 |

The pressure in the extruder was less than about 10 bars. The average or median residence time of the ingredients heated prior to addition of component 4 at the second feed port was about 40-50 seconds. The average or median residence time of the ingredients in the extruder from the second feed port was about 10 to 20 seconds.

The substantially homogeneous dough-like mixture formed in the extruder was extruded through a horizontally oriented slit die (about 5 mm high by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 and ¼".

Six pieces were subjected to microwaving in a microwave oven for about 50 seconds to produce distinctly leavened cookies. The cookies were surface browned and had a crumb-like structure and crumb-like texture.

EXAMPLE 18

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: first dry feed port | |
| White sugar (sucrose), granulated | 14.72 |
| Brown sugar (about 89% sucrose, 3% invert, 4% non-sugar solids, 3% water) | 6.86 |
| Vanilla | 1.23 |
| Sodium bicarbonate | 0.25 |
| Component 3: first liquid feed port | |
| Soybean spray oil | 22.56 |
| Component 4: second liquid feed port | |
| Tap water | 2.25 |

| -continued | |
|---|---|
| INGREDIENT AND PLACEMENT | WEIGHT % |
| Total | 100.00 |

The co-rotating twin screw cooker extruder system of Example 17 was used to prepare the cookie products of the present invention.

The screws were rotated at about 125 rpm at about 3% of maximum torque. The ingredients were fed in their relative amounts to provide a throughput or mass flow rate of the dough-like mixture extrudate of about 201 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed to the first dry feed port but separate from component 1. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 247 |
| 3 | 350 | — |
| 4 | 350 | 302 |
| 5 | 350 | 333 |
| 6 | 350 | — |
| 7 | 200 | 198 |
| 8 | <100 | 98 |
| 9 | 100 | — |
| 10 | 100 | 105 |
| 11 | 110 | — |
| 12 | 110 | 113 |

The pressure in the extruder was less than about 10 bars. The material temperatures in the extruder were about 231° F. at barrel 7, and about 137° F. at barrel 12. The average or median residence time of the ingredients heated prior to addition of component 4 at the second feed port was about 40–50 seconds. The average or median residence time of the ingredients in the extruder from the second feed port was about 10 to 20 seconds.

The substantially homogeneous dough-like mixture formed in the extruder was extruded through a horizontally oriented slit die (about 5 mm high by about 50 mm wide) to obtain a continuous, substantially unleavened ribbon. The extrudate temperature upon exiting the extruder was about 151° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. A cookie sample had an internal temperature of about 226° F. upon microwaving. The cookies were surface browned and had a crumb-like structure and crumb-like texture.

EXAMPLE 19

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
|---|---|
| Component 1: first dry feed port | |
| Wheat flour, bleached (about 12% by weight water) | 48.66 |
| Non-fat dry milk (about 52% by weight lactose) | 1.46 |
| Salt | 0.73 |
| White sugar (sucrose), granulated | 14.60 |
| Component 2 second dry feed port | |
| Brown sugar (about 89% sucrose, 3% invert, 4% non-sugar solids, 3% water) | 6.81 |
| Sodium bicarbonate | 1.22 |
| Component 3: first liquid feed port | |
| Soybean spray oil | 24.33 |
| Component 4: second liquid feed port | |
| Tap water | 2.19 |
| Total | 100.00 |

The co-rotating twin screw cooker extruder system of Example 17 may be used to prepare the cookie products of the present invention.

The screws may be rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 8.2% by weight, based upon the total weight of the dough-like mixture.

The barrel set temperatures, pressures, and residence times may be the same as in Example 17.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1¼".

Six pieces having an average weight of about 4.2 gm/piece may be subjected to microwaving in a microwave oven for about 50 seconds to produce distinctly leavened surface browned cookies having a crumb-like structure and crumb-like texture.

EXAMPLE 20

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
|---|---|
| Component 1: first dry feed port | |
| Wheat flour, bleached (about 12% by weight water) | 55.00 |
| Non-fat dry milk (about 52% by weight lactose) | 1.65 |
| Salt | 0.83 |
| White sugar (sucrose), granulated | 8.80 |
| Component 2: second dry feed port | |
| Brown sugar (about 89% sucrose, 3% invert, 4% non-sugar solids, 3% water) | 3.85 |
| Aspartame | 0.06 |
| Component 3: first liquid feed port | |
| Soybean spray oil | 24.75 |
| Component 4: second liquid feed port | |
| Tap water | 5.06 |
| Total | 100.00 |

The co-rotating twin screw cooker extruder system of Example 17 may be used to prepare the cookie products of the present invention.

The screws may be rotated at about 225 rpm at about 8% of maximum torque. The ingredients may be fed in their relative amounts to provide a throughput or mass flow rate of the dough-like mixture extrudate of about 181 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 11.8% by weight, based upon the total weight of the dough-like mixture.

The barrel set temperatures, pressures, and residence times may be the same as in Example 17.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1¼".

Six pieces having an average weight of about 4.2 gm/piece may be subjected to microwaving in a microwave oven for about 50 seconds to produce distinctly leavened surface browned cookies having a crumb-like structure and crumb-like texture.

EXAMPLE 21

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
|---|---|
| Component 1: first dry feed port | |
| Wheat flour, bleached (about 12% by weight water) | 24.67 |
| Oat bran (about 12% by weight water) | 24.67 |
| Non-fat dry milk (about 52% by weight lactose) | 1.48 |
| Salt | 0.74 |
| White sugar (sucrose), granulated | 14.80 |
| Component 2: second dry feed port | |
| Brown sugar (about 89% sucrose, 3% invert, 4% non-sugar solids, 3% water) | 6.91 |
| Component 3: first liquid feed port | |
| Soybean spray oil | 22.20 |
| Component 4: second liquid feed port | |
| Tap water | 4.53 |
| Total | 100.00 |

The co-rotating twin screw cooker extruder system of Example 17 may be used to prepare the cookie products of the present invention.

The screws may be rotated at about 225 rpm at about 5% of maximum torque. The ingredients may be fed in their relative amounts to provide a throughput or mass flow rate of the dough-like mixture extrudate of about 203 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 10.7% by weight, based upon the total weight of the dough-like mixture.

The barrel set temperatures, pressures, and residence times may be the same as in Example 17.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1¼".

Six pieces having an average weight of about 4.2 gm/piece may be subjected to microwaving in a microwave oven for about 50 seconds to produce distinctly leavened surface browned cookies having a crumb-like structure and crumb-like texture.

EXAMPLE 22

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
|---|---|
| Component 1: first dry feed port | |

| INGREDIENT AND PLACEMENT | WEIGHT % |
|---|---|
| Wheat flour, bleached (about 12% by weight water) | 45.72 |
| Non-fat dry milk (about 52% by weight lactose) | 1.37 |
| Salt | 0.69 |
| White sugar (sucrose), granulated | 13.72 |
| Component 2: second dry feed port | |
| Brown sugar (about 89% sucrose, 3% invert, 4% non-sugar solids, 3% water) | 6.40 |
| Nut pieces (walnut fluff) | 7.31 |
| Component 3: first liquid feed port | |
| Soybean spray oil | 20.58 |
| Component 4: second liquid feed port | |
| Tap water | 4.21 |
| Total | 100.00 |

The co-rotating twin screw cooker extruder system of Example 17 may be used to prepare the cookie products of the present invention.

The screws may be rotated at about 225 rpm at about 5% of maximum torque. The ingredients may be fed in their relative amounts to provide a throughput or mass flow rate of the dough-like mixture extrudate of about 218 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 10.7% by weight, based upon the total weight of the dough-like mixture.

The barrel set temperatures, pressures, and residence times may be the same as in Example 17.

The substantially homogeneous dough-like mixture formed in the extruder may be extruded through a horizontally oriented slit die (about 5 mm high by about 50 mm wide) to obtain a continuous, substantially unleavened ribbon having a temperature upon exiting the extruder of less than about 150° F. The ribbon may be cut into cylindrical pieces having a diameter of about 1¼".

Six pieces having an average weight of about 4.2 gm/piece may be subjected to microwaving in a microwave oven for about 50 seconds to produce distinctly leavened surface browned cookies having a crumb-like structure and crumb-like texture.

EXAMPLE 23

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached | 49.88 |
| (about 12% by weight water) | |
| Non-fat dry milk (about 52% by weight lactose) | 1.50 |
| Salt | 0.75 |
| Component 2: first dry feed port | |
| White sugar (sucrose), granulated | 15.64 |
| Brown sugar (about 89% sucrose, 3% invert, 4% non-sugar solids, 3% water) | 7.29 |
| Vitamin mix | 0.13 |
| Component 3: first liquid feed port | |
| Soybean spray oil | 22.56 |
| Component 4: second liquid feed port | |
| Tap water | 2.25 |
| Total | 100.00 |

The co-rotating twin screw cooker extruder system of Example 17 was used to prepare the cookie products of the present invention.

The screws were rotated at about 125 rpm at about 3% of maximum torque. The ingredients were fed in their relative amounts to provide a throughput or mass flow rate of the dough-like mixture extrudate of bout 203 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed to the first dry feed port but separate from component 1. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 235 |
| 3 | 350 | — |
| 4 | 350 | 281 |
| 5 | 350 | 341 |
| 6 | 350 | — |
| 7 | 200 | 199 |
| 8 | <100 | 92 |
| 9 | 100 | — |
| 10 | 100 | 104 |
| 11 | 110 | — |
| 12 | 110 | 125 |

The pressure in the extruder was less than about 10 bars. The material temperatures in the extruder were about 231° F. at barrel 7, and about 143° F. at barrel 12. The average or median residence time of the ingredients heated prior to addition of component 4 at the second feed port was about 40-50 seconds. The average or median residence time of the ingredients in the extruder from the second feed port was about 10 to 20 seconds.

The substantially homogeneous dough-like mixture formed in the extruder was extruded through a horizontally oriented slit die (about 5 mm high by about 50 mm wide) to obtain a continuous, substantially unleavened ribbon. The extrudate temperature upon exiting the extruder was about 142° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. The cookies were surface browned and had a crumb-like structure and crumb-like texture.

EXAMPLE 24

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
| --- | --- |
| Component 1: first dry feed port | |
| Wheat flour, bleached (about 12% by weight water) | 48.43 |
| Non-fat dry milk (about 52% by weight lactose) | 1.45 |
| Salt | 0.73 |
| Component 2: first dry feed port | |
| White sugar (sucrose), granulated | 14.53 |
| Brown sugar (about 89% sucrose, 3% invert, 4% non-sugar solids, 3% water) | 6.78 |
| Component 3: first liquid feed port | |
| Soybean spray oil | 24.21 |
| Component 4: second liquid feed port | |
| Tap water | 3.87 |
| Total | 100.00 |

The co-rotating twin screw cooker extruder system of Example 17 may be used to prepare the cookie products of the present invention.

The screws may be rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed to the first dry feed port but separate from component 1. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 10.7% by weight, based upon the total weight of the dough-like mixture.

The barrel set temperatures, pressures, and residence times may be the same as in Example 17.

The substantially homogeneous dough-like mixture formed in the extruder may be extruded without a die to obtain a substantially unleavened extrudate dough having a temperature upon exiting the extruder of less than about 150° F. The extrudate may be transferred or drop into the hopper of a conventional cookie wire-cutting machine. The wire-cutting machine may be equipped with a screw-type or auger feed or counter-rotating grooved rollers for feeding the extrudate through nozzles. Upon emerging through the nozzles, the extrudate is cut into cylindrical pieces by the wire. Six of the pieces may be subjected to microwaving in a microwave oven for about 60 seconds to produce distinctly leavened, surface browned cookies having a crumb-like structure and crumb-like texture.

EXAMPLE 25

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
| --- | --- |
| Component 1: first dry feed port | |
| Wheat flour, bleached (about 12% by weight water) | 49.08 |
| Non-fat dry milk (about 52% by weight lactose) | 1.48 |
| Salt | 0.74 |
| Component 2: second dry feed port | |
| White sugar (sucrose), granulated | 15.13 |
| Brown sugar (about 89% sucrose, 3% invert, 4% non-sugar solids, 3% water) | 7.06 |
| Component 3: first liquid feed port | |
| Soybean spray oil | 24.66 |
| Component 4: second liquid feed port | |
| Sodium bicarbonate | 0.17 |
| Tap water | 1.68 |
| Total | 100.00 |

The co-rotating twin screw cooker extruder used to prepare the cookie products of the present invention was a Werner and Pfleiderer ZSK-57 equipped with a screw configuration as shown and described in copending U.S. patent application Ser. No. 362,375 entitled "Extruder Apparatus For Producing An At Least Partially Baked Product Having A Cookie-Like Crumb Structure," filed in the name of Bernhard Van Lengerich on June 7, 1989. The extruder had twelve barrels, each provided with external, jacketed heating and cooling means. The first and second dry feed ports were set up at barrels 1 and 8, respectively. These two dry feed ports were open to the atmosphere. The first liquid feed port was set up between barrels 1 and 2. The second liquid feed port was the same as the second dry feed port at barrel 8. The second liquid feed inlet pipe was inserted into the open port at barrel 8 so that the second dry feed ingredients and the second liquid feed ingredients were separately fed into the same port.

The first barrel, which contained the first dry feed port, was set on constant cool. The remaining eleven barrels were divided into 7 separately measured barrel temperature zones. Barrels 2 and 3 corresponded to temperature zone 1, barrel 4 corresponded to zone 2, barrels 5 and 6 corresponded to zone 3, barrels 7 and 8 corresponded to zones 4, and 5, respectively, barrels 9 and 10 corresponded to temperature zone 6, and barrels 11 and 12 corresponded to temperature zone 7. The thermocouples for measuring actual barrel temperatures were located in barrels 2, 4, 5, 7, 8, 10, and 12.

Barrels 2 through 6 were set to heat to 350° F., barrel seven to 200° F., barrel eight was set on constant cool, barrels 9 and 10 were set at 100° F. and barrels 11 and 12 were set at 120° F.

Paddles and screw elements were arranged on the screw shafts from upstream to downstream to provide: (a) rapid conveying of the added dry ingredients in barrel 1, (b) conveying of the dry ingredients and added oil and gradually increasing the degree of fill in barrel 2, (c) chopping or mixing action for admixing the oil and dry ingredients, conveying to gradually increase the degree of fill, and mixing in barrel 3, (d) repeated conveying and an increased degree of mixing in barrel 4, (e) increased mixing, conveying and increased mixing to gradually increase the degree of fill in each of barrels 5 and 6, (f) increased mixing, conveying, and increased mixing to provide the highest degree of mixing in barrel 7, (g) fast conveying of the dry and liquid ingredients fed to the port in barrel 8, (h) conveying with a gradual increase in degree of fill in barrel 9, (i) conveying and mixing with a gradual increase in degree of fill in barrel 10, (j) conveying and mixing in barrel 11, and (k) conveying with a buildup in pressure sufficient to extrude the dough-like mixture through the extruder die. Gradually increasing the degree of fill tends to reduce points of high pressure which may cause oil separation.

The screws were rotated at about 125 rpm at about 2% of maximum torque. The ingredients were fed in their relative amounts to provide a throughput or mass flow rate of the dough-like mixture extrudate of about 405 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was prepared by dissolving the sodium bicarbonate in the water to form a solution which was continuously fed to the second liquid feed port.

On a calculated basis, the water content of the dough-like mixture formed in the extruder was about 7.8% by weight, based upon the total weight of the dough-like mixture.

At steady state, the barrel set temperatures and the actual barrel temperatures were:

| Barrel # | Barrel Set Temperatur,°F. | Actual Barrel Temperature, °F. |
|---|---|---|
| 1 | cool | — |
| 2 | 350 | 206 |
| 3 | 350 | — |
| 4 | 350 | 245 |
| 5 | 350 | 324 |
| 6 | 350 | — |
| 7 | 200 | 201 |
| 8 | cool | <100 |
| 9 | 100 | — |
| 10 | 100 | <100 |
| 11 | 120 | — |
| 12 | 120 | 115 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. The cookies were surface browned and had a crumb-like structure and crumb-like texture.

EXAMPLE 26

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: second dry feed port | |
| White sugar (sucrose), granulated | 14.72 |
| Brown sugar (about 89% sucrose, 3% invert, 4% non-sugar solids, 3% water) | 6.86 |
| Vanilla | 1.23 |
| Sodium bicarbonate | 0.25 |
| Component 3: first liquid feed port | |
| Soybean spray oil | 22.56 |
| Component 4: second liquid feed port | |
| Tap water | 2.25 |
| Total | 100.00 |

The co-rotating twin screw cooker extruder system of Example 25 was used to prepare the cookie products of the present invention.

The screws were rotated at about 125 rpm at about 2% of maximum torque. The ingredients were fed in their relative amounts to provide a throughput or mass flow rate of the dough-like mixture extrudate of about 200 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 247 |
| 3 | 350 | — |
| 4 | 350 | 307 |
| 5 | 350 | 309 |
| 6 | 350 | — |
| 7 | 200 | 201 |
| 8 | <100 | 122 |
| 9 | 100 | — |
| 10 | 100 | 99 |
| 11 | 110 | — |
| 12 | 110 | 112 |

The pressure in the extruder was less than about 10 bars. The material temperatures in the extruder were about 230° F. at barrel 7, and about 131° F. at barrel 12. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was about 125° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. A cookie sample had an internal temperature of about 217° F. upon microwaving. The cookies were surface browned and had a crumb-like structure and crumb-like texture.

EXAMPLE 27

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 48.66 |
| Non-fat dry milk (about 52% by weight lactose) | 1.46 |
| Salt | 0.73 |
| Component 2: second dry feed port | |
| White sugar (sucrose), granulated | 14.60 |
| Brown sugar (about 89% sucrose, 3% invert, 4% non-sugar solids, 3% water) | 6.81 |
| Sodium bicarbonate | 1.22 |
| Component 3: first liquid feed port | |
| Soybean spray oil | 24.33 |
| Component 4: second liquid feed port | |
| Tap water | 2.19 |
| Total | 100.00 |

The co-rotating twin screw cooker extruder system of Example 25 was used to prepare to cookie products of the present invention.

The screws were rotated at about 125 rpm at about 2% of maximum torque. The ingredients were fed in their relative amounts to provide a throughput or mass flow rate of the dough-like mixture extrudate of about 405 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.2% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 206 |
| 3 | 350 | — |
| 4 | 350 | 245 |
| 5 | 350 | 324 |
| 6 | 350 | — |
| 7 | 200 | 201 |
| 8 | cool | <100 |
| 9 | 100 | — |
| 10 | 100 | <100 |
| 11 | 120 | — |
| 12 | 120 | 115 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

Six pieces were subjected to microwaving in a microwave oven for about 50 seconds to produce distinctly leavened cookies. The cookies were surface browned and had a crumb-like structure and crumb-like texture.

EXAMPLE 28

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 55.00 |
| Non-fat dry milk (about 52% by | 1.65 |

-continued

| INGREDIENT AND PLACEMENT | WEIGHT % |
|---|---|
| weight lactose) | |
| Salt | 0.83 |
| Component 2: second dry feed port | |
| White sugar (sucrose), granulated | 8.80 |
| Brown sugar (about 89% sucrose, 3% invert, 4% non-sugar solids, 3% water) | 3.85 |
| Aspartame | 0.06 |
| Component 3: first liquid feed port | |
| Clarified butter | 24.75 |
| Component 4: second liquid feed port | |
| Tap water | 5.06 |
| Total | 100.00 | the co-rotating twin screw cooker extruder system of Example 25 was used to prepare the cookie products of the present invention.

The screws were rotated at about 225 rpm at about 8% of maximum torque. The ingredients were fed in their relative amounts to provide a throughput or mass flow rate of the dough-like mixture extrudate of about 181 lbs. hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid clarified butter to obtain a liquid oil which was continuously fed to the first liquid feed port. Component 4 was continuously fed to the second liquid feed port.

On a calculated basis, the water content of the dough-like mixture formed in the extruder was about 11.8% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 298 |
| 3 | 350 | — |
| 4 | 350 | 335 |
| 5 | 350 | 290 |
| 6 | 350 | — |
| 7 | 200 | 195 |
| 8 | cool | 100 |
| 9 | 100 | — |
| 10 | 100 | 100 |
| 11 | 120 | — |
| 12 | 120 | 119 |

The pressure in the extruder was less than about 10 bars. The average or median residence time of the ingredients heated prior to addition of components 2 and 4 at the second feed ports was about 40-50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

Six pieces were subjected to microwaving in a microwave oven for about 50 seconds to produce distinctly leavened cookies. The cookies were surface browned and had a crumb-like structure and crumb-like texture.

EXAMPLE 29

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 24.67 |
| Oat bran (about 12% by weight water) | 24.67 |
| Non-fat dry milk (about 52% by weight lactose) | 1.48 |
| Salt | 0.74 |
| Component 2: second dry feed port | |
| White sugar (sucrose), granulated | 14.80 |
| Brown sugar (about 89% sucrose, 3% invert, 4% non-sugar solids, 3% water) | 6.91 |
| Component 3: first liquid feed port | |
| Clarified butter | 22.20 |
| Component 4: second liquid feed port | |
| Sodium bicarbonate | 0.41 |
| Tap water | 4.12 |
| Total | 100.00 |

The co-rotating twin screw cooker extruder system of Example 25 was used to prepare the cookie products of the present invention.

The screws were rotated at about 225 rpm at about 5% of maximum torque. The ingredients were fed in their relative amounts to provide a throughput or mass flow rate of the dough-like mixture extrudate of about 203 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid clarified butter to obtain a liquid oil which was continuously fed to the first liquid feed port. Component 4 was prepared by dissolving the sodium bicarbonate in the water to form a solution which was continuously fed to the second liquid feed port.

On a calculated basis, the water content of the dough-like mixture formed in the extruder was about 10.2% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 276 |
| 3 | 350 | — |
| 4 | 350 | 311 |

-continued

| Barrel # | Barrel Set Temperature, °F. | Actual Barrel Temperature, °F. |
|---|---|---|
| 5 | 350 | 289 |
| 6 | 350 | — |
| 7 | 200 | 198 |
| 8 | cool | 100 |
| 9 | 100 | — |
| 10 | 100 | 100 |
| 11 | 120 | — |
| 12 | 120 | 122 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

Six pieces were subjected to microwaving in a microwave oven for about 50 seconds to produce distinctly leavened cookies. The cookies were surface browned and had a crumb-like structure and crumb-like texture.

EXAMPLE 30

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 45.72 |
| Non-fat dry milk (about 52% by weight lactose) | 1.37 |
| Salt | 0.69 |
| Component 2: second dry feed port | |
| White sugar (sucrose), granulated | 13.72 |
| Brown sugar (about 89% sucrose, 3% invert, 4% non-sugar solids, 3% water) | 6.40 |
| Nut pieces (walnut fluff) | 7.31 |
| Component 3: first liquid feed port | |
| Clarified butter | 20.58 |
| Component 4: second liquid feed port | |
| Sodium bicarbonate | 0.38 |
| Tap water | 3.83 |
| Total | 100.00 |

The co-rotating twin screw cooker extruder system of Example 25 was used to prepare the cookie products of the present invention.

The screws were rotated at about 225 rpm at about 5% of maximum torque. The ingredients were fed in their relative amounts to provide a throughput or mass flow rate of the dough-like mixture extrudate of about 218 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogeneous dry blend which was continuously fed downstream to the second dry feed port. Component 3 was prepared by melting the semi-solid clarified butter to obtain a liquid oil which was continuously fed to the first liquid feed port. Component 4 was prepared by dissolving the sodium bicarbonate in the water to form a solution which was continuously fed to the second liquid feed port.

On a calculated basis, the water content of the dough-like mixture formed in the extruder was about 10.3% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 276 |
| 3 | 350 | — |
| 4 | 350 | 311 |
| 5 | 350 | 289 |
| 6 | 350 | — |
| 7 | 200 | 198 |
| 8 | cool | 100 |
| 9 | 100 | — |
| 10 | 100 | 100 |
| 11 | 120 | — |
| 12 | 120 | 122 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1 ¼".

Six pieces were subjected to microwaving in a microwave oven for about 50 seconds to produce distinctly leavened cookies. The cookies were surface browned and had a crumb-like structure and crumb-like texture.

EXAMPLE 31

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: second dry feed port | |
| White sugar (sucrose), granulated | 15.64 |
| Brown sugar (about 89% sucrose, | 7.29 |

-continued

| INGREDIENT AND PLACEMENT | WEIGHT % |
|---|---|
| 3% invert, 4% non-sugar solids, 3% water) | |
| Vitamin mix | 0.13 |
| Component 3: first liquid feed port | |
| Soybean spray oil | 22.56 |
| Component 4: second liquid feed port | |
| Tap water | 2.25 |
| Total | 100.00 |

The co-rotating twin screw cooker extruder system of Example 25 was used to prepare the cookie products of the present invention.

The screws were rotated at about 125 rpm at about 2% of maximum torque. The ingredients were fed in their relative amounts to provide a throughput or mass flow rate of the dough-like mixture extrudate of about 203 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 228 |
| 3 | 350 | — |
| 4 | 350 | 283 |
| 5 | 350 | 340 |
| 6 | 350 | — |
| 7 | 200 | 200 |
| 8 | <100 | 138 |
| 9 | 100 | — |
| 10 | 100 | 98 |
| 11 | 110 | — |
| 12 | 110 | 111 |

The pressure in the extruder was less than about 10 bars. The material temperatures in the extruder were about 236° F. at barrel 7, and about 135° F. at barrel 12. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was about 143° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. A cookie sample had an internal temperature of about 227° F. upon microwaving. The cookies were surface browned and had a crumb-like structure and crumb-like texture.

EXAMPLE 32

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
|---|---|
| Component 1: first dry feed port | |
| Wheat flour, bleached (about 12% by weight water) | 48.43 |
| Non-fat dry milk (about 52% by weight lactose) | 1.45 |
| Salt | 0.73 |
| Component 2: second dry feed port | |
| White sugar (sucrose), granulated | 14.53 |
| Brown sugar (about 89% sucrose, 3% invert, 4% non-sugar solids, 3% water) | 6.78 |
| Component 3: first liquid feed port | |
| Soybean spray oil | 24.21 |
| Component 4: second liquid feed port | |
| Tap water | 3.87 |
| Total | 100.00 |

The co-rotating twin screw cooker extruder system of Example 25 may be used to prepare the cookie products of the present invention.

The screws may rotated at about 125 rpm at about 2% of maximum torque. The ingredients may be fed in their relative amounts to provide a throughput or mass flow rate of the dough-like mixture extrudate of about 405 lbs/hr.

Components 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder is about 10.7% by weight, based upon the total weight of the dough-like mixture.

The barrel set temperatures, pressures, and residence times may be the same as in Example 25.

The substantially homogeneous dough-like mixture formed in the extruder may be extruded without a die to obtain a substantially unleavened extrudate dough having a temperature upon exiting the extruder of less than about 150° F. The extrudate may be transferred or drop into the hopper of a conventional cookie wire-cutting machine. The wire-cutting machine may be equipped with a screw-type or auger feed or counter-rotating grooved rollers for feeding the extrudate through nozzles. Upon emerging through the nozzles, the extrudate is cut into cylindrical pieces by the wire. Six of the pieces may be subjected to microwaving in a microwave oven for 60 seconds to produce distinctly leavened, surface browned cookies having a crumb-like structure and crumb-like texture.

EXAMPLE 33

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Oat bran (about 12% by weight water) | 48.31 |
| Component 2: second dry feed port | |
| White sugar (sucrose), granulated | 14.02 |
| Brown sugar (about 89% sucrose, 3% invert, 4% non-sugar solids, 3% water) | 6.56 |
| Sodium bicarbonate | 1.17 |
| Component 3: first liquid feed port | |
| Soybean spray oil | 21.73 |
| Component 4: second liquid feed port | |
| Tap water | 8.21 |
| Total | 100.00 |

The co-rotating twin screw cooker extruder system of Example 25 was used to prepare the cookie products of the present invention.

The screws were rotated at about 145 rpm at about 1% of maximum torque. The ingredients were fed in their relative amounts to provide a throughput or mass flow rate of the dough-like mixture extrudate of about 207 lbs/hr.

Component 1 was continuously fed to the first dry feed port. Component 2 was prepared by mixing the ingredients to obtain a substantially homogeneous dry blend which was continuously fed downstream to the second dry feed port. Component 3 was prepared by melting the semi-solid clarified butter to obtain a liquid oil which was continuously fed to the first liquid feed port. Component 4 was continuously fed to the second liquid feed port.

On a calculated basis, the water content of the dough-like mixture formed in the extruder was about 14.2% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | heater not working | 117 |
| 3 | heater not working | — |
| 4 | 350 | 235 |
| 5 | 350 | 335 |
| 6 | 350 | — |
| 7 | 200 | 195 |
| 8 | 100 | 115 |
| 9 | 100 | — |
| 10 | 100 | 100 |
| 11 | 120 | — |
| 12 | 120 | 120 |

The pressure in the extruder was less than about 10 bars. The material temperatures in the extruder were about 229° F. at barrel 7 and about 137° F. at barrel 12. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was about 138° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. The cookies were surface browned and had a crumb-like structure and crumb-like texture.

EXAMPLE 34

The ingredients, their feed placement, and their relative amounts used to prepare a cookie bit or cookie chip product having a crumb-like structure and texture using extrusion heating and convection baking in accordance with the present invention were:

| INGREDIENT AND PLACEMENT | WEIGHT % |
|---|---|
| Component 1: first dry feed port | |
| Wheat flour, bleached (about 12% by weight water) | 49.03 |
| Non-fat dry milk (about 52% by weight lactose) | 1.47 |
| Salt | 0.74 |
| Component 2: second dry feed port | |
| White sugar (sucrose), granulated | 14.30 |
| Brown sugar (about 89% sucrose, 3% invert, 4% non-sugar solids, 3% water) | 6.67 |
| Sodium bicarbonate | 1.19 |
| Component 3: first liquid feed port | |
| Soybean spray oil | 22.17 |
| Component 4: second liquid feed port | |
| Tap water | 4.43 |
| Total | 100.00 |

The co-rotating twin screw cooker extruder system of Example 25 was used to prepare the cookie products of the present invention.

The screws were rotated at about 145 rpm at about 1% of maximum torque. The ingredients were fed in their relative amounts to provide a throughput or mass flow rate of the dough-like mixture extrudate of about 207 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 10.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | heater not working | 118 |
| 3 | heater not working | — |
| 4 | 350 | 237 |
| 5 | 350 | 334 |
| 6 | 350 | — |
| 7 | 200 | 196 |
| 8 | 100 | 117 |
| 9 | 100 | — |
| 10 | 100 | 106 |
| 11 | 120 | — |
| 12 | 120 | 121 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded without a die and the extrudate fell and formed into substantially unleavened pieces. The extrudate temperature upon exiting the extruder was less than about 150° F.

The extrudate pieces were subjected to heating in a convection oven at about 350° F. for about six minutes to produce distinctly leavened, surface browned cookie pieces having a crumb-like structure and crumb-like texture. The cookie pieces were screened to obtain "chocolate chip size" pieces. A "reverse chocolate chip cookie" product or "cookie chip chocolate" product may be produced by incorporating the cookie chips or cookie bits into melted chocolate in a cookie-shaped mold followed by solidification of the chocolate by cooling it. The amount of cookie chips used may be about 25% by weight, based upon the total weight of the chocolate and the cookie chips.

What is claimed is:

1. A method for producing cookies comprising:
   (a) forming a substantially homogeneous dough-like mixture in a cooker extruder by heating ingredients comprising at least one flour and shortening or fat to a temperature of at least about 150° F. under conditions to prevent substantial starch gelatinization, the amount of shortening or fat being at least about 12% by weight, based upon the weight of the dough-like mixture,
   (b) extruding the dough-like mixture,
   (c) forming the extrudate into pieces, and
   (d) leavening the pieces by subjecting them to post extrusion heating to obtain a crumb-like structure.

2. A method as claimed in claim 1 wherein said ingredients are heated in said cooker extruder to a temperature of at least about 200° F. to form a heat treated mass and water is admixed with the heat treated mass to obtain said dough-like mixture.

3. A method as claimed in claim 2 wherein said heat treated mass is cooled to a temperature of less than about 150° F.

4. A method as claimed in claim 1 wherein the water content of said dough-like mixture is less than about 15% by weight, based upon the weight of the dough-like mixture.

5. A method as claimed in claim 1 wherein the shortening or fat content of said dough-like mixture is from about 20% by weight to about 30% by weight, based upon the weight of the dough-like mixture.

6. A method as claimed in claim 1 wherein at least one crystalline sugar is admixed with the ingredients comprising flour and shortening or fat in an amount of at least about 10% by weight crystalline sugar on a sugar solids basis, said percentage being based upon the weight of the dough-like mixture.

7. A method as claimed in claim 6 wherein said crystalline sugar comprises sucrose.

8. A method as claimed in claim 7 wherein at least one reducing sugar is admixed with said ingredients comprising flour in an amount which promotes Maillard browning.

9. A method as claimed in claim 1 wherein at least one protein source is admixed with said ingredients comprising flour in an amount which promotes Maillard browning.

10. A method as claimed in claim 2 wherein said dough-like mixture comprises:
    (a) less than about 20% by weight water,
    (b) from about 12% by weight to about 40% by weight shortening or fat,
    (c) from about 10% by weight to about 40% by weight of at least one sugar, on a sugar solids basis, and
    (d) from about 30% by weight to about 70% by weight of at least one flour,
    said percentages being based upon the weight of said dough-like mixture.

11. A method as claimed in claim 2 wherein said heat treated mass is formed at a pressure within the cooker extruder of less than about 10 bars absolute.

12. A method as claimed in claim 11 wherein the average residence time of said ingredients comprising flour at a temperature of at least about 200° F. is from about 15 seconds to about 90 seconds.

13. A method as claimed in claim 12 wherein the average residence time of the ingredients in the cooker extruder from the point of addition of the added water to the heat treated mass is from about 10 seconds to about 60 seconds.

14. A method as claimed in claim 3 wherein said heat treated mass is cooled to a temperature of less than about 150° F. prior to addition of said water.

15. A method as claimed in claim 2 wherein the temperature of said heat treated mass is reduced by at least about 35° F. prior to said addition of the water to the heat treated mass.

16. A method as claimed in claim 10 wherein at least a portion of said sugar is admixed with the flour and shortening or fat prior to said addition of the water to the heat treated mass.

17. A method as claimed in claim 10 wherein at least a portion of said sugar is subjected to said heating for forming said heat treated mass.

18. A method as claimed in claim 10 wherein at least a portion of said sugar is admixed with the heat treated mass after reducing the temperature of the heat treated mass.

19. A method as claimed in claim 10 wherein at least a portion of said sugar and the water are admixed with said heat-treated mass.

20. A method as claimed in claim 2 wherein the amount of water admixed with said heat treated mass is from about 0.5% by weight to about 10% by weight, based upon the weight of the dough-like mixture.

21. A method as claimed in claim 20 wherein the water admixed with the heat treated mass comprises a liquid source of water selected from the group consisting of high fructose corn syrup, corn syrup, sucrose syrup, and mixtures thereof.

22. A method as claimed in claim 2 wherein the water content of the dough-like mixture is sufficiently low so as to avoid substantial starch gelatinization.

23. A method as claimed in claim 1 wherein the water content of the dough-like mixture is such that additional water will increase the consistency of the dough-like mixture.

24. A method as claimed in claim 3 wherein after cooling said heat treated mass, it is heated to control its flow through an extrusion die.

25. A method as claimed in claim 1 where said dough-like mixture is coextruded with a filler material and the coextrudate is formed into pieces.

26. A method as claimed in claim 1 wherein the dough-like mixture is extruded at a temperature of from about 100° F. to about 212° F.

27. A method for the production of cookies comprising:
(a) heating ingredients comprising flour, at least one sugar and shortening or fat, in a cooker extruder to a temperature of at least about 150° F. to form a heat treated mass,
(b) admixing water with the heat treated mass in said extruder to obtain a substantially homogeneous dough-like mixture,
(c) forming the dough-like mixture into pieces, and
(d) leavening the pieces by subjecting them to microwave energy.

28. A method as claimed in claim 27 wherein said ingredients are heated in said cooker extruder to a temperature of at least about 200° F. to form said heat treated mass.

29. A method as claimed in claim 28 wherein said heat treated mass is cooled to a temperature of less than about 150° F. so as to avoid substantial separation of oil and to avoid extruder surging.

30. A method as claimed in claim 27 wherein the water content of said dough-like mixture is less than about 15% by weight based upon the weight of the dough-like mixture.

31. A method as claimed in claim 27 wherein at least one sugar and water are admixed with said heat treated mass in said extruder to obtain a substantially homogeneous dough-like mixture.

32. A method as claimed in claim 27 wherein the shortening or fat content of said dough-like mixture is at least about 12% by weight, based upon the weight of the dough-like mixture.

33. A method as claimed in claim 27 wherein said at least one sugar comprises a crystalline sugar in an amount of at least about 10% by weight crystalline sugar on a sugar solids basis, said percentage being based upon the weight of the dough-like mixture.

34. A method as claimed in claim 33 wherein said crystalline sugar comprises sucrose.

35. A method as claimed in claim 34 wherein at least one reducing sugar is admixed with said ingredients comprising flour in an amount which promotes Maillard browning.

36. A method as claimed in claim 27 wherein at least one protein source is admixed with said ingredients comprising flour in an amount which promotes Maillard browning.

37. A method as claimed in claim 27 wherein said dough-like mixture comprises:
(a) less than about 20% by weight water,
(b) from about 12% by weight to about 40% by weight shortening or fat,
(c) from about 10% by weight to about 40% by weight of at least one sugar, on a sugar solids basis, and,
(d) from about 30% by weight to about 70% by weight of at least one flour,
said percentages being based upon the weight of said dough-like mixture.

38. A method as claimed in claim 27 wherein the water is admixed with the heat treated mass at a heat treated mass temperature of from about 110° F. to about 212° F. to obtain said substantially homogeneous cookie dough-like mixture.

39. A method as claimed in claim 27 wherein said ingredients are heated in said cooker extruder to a temperature of from about 300° F. to about 500° F. to form said heat treated mass.

40. A method as claimed in claim 27 wherein said at least one sugar comprises a reducing sugar.

41. A method as claimed in claim 27 wherein said flour comprises at least one member selected from the group consisting of wheat flour, corn flour, coat flour, barley flour, rye flour, rice flour, potato flour, grain sorghum flour, corn starch, and physically and/or chemically defined flours or starches.

42. A method for the production of cookies comprising:
(a) heating ingredients comprising flour, at least one sugar and shortening or fat, in a cooker extruder to a temperature of at least about 150° F. to form a heat treated mass,
(b) admixing water with the heat treated mass in said extruder to obtain a substantially homogeneous dough-like mixture,
(c) forming the dough-like mixture into pieces, and
(d) leavening the pieces by subjecting them to dielectric radio frequency energy.

43. A method as claimed in claim 42 wherein said ingredients are heated in said cooker extruder to a temperature of at least about 200° F. to form said heat treated mass.

44. A method as claimed in claim 43 wherein said heat treated mass is cooled to a temperature of less than about 150° F. so as to avoid substantial separation of oil and to avoid extruder surging.

45. A method as claimed in claim 42 wherein the water content of said dough-like mixture is less than about 15% by weight based upon the weight of the dough-like mixture.

46. A method as claimed in claim 42 wherein at least one sugar and water are admixed with said heat treated mass in said extruder to obtain a substantially homogeneous dough-like mixture.

47. A method as claimed in claim 42 wherein the shortening or fat content of said dough-like mixture is at least about 12% by weight, based upon the weight of the dough-like mixture.

48. A method as claimed in claim 42 wherein said at least one sugar comprises a crystalline sugar in an amount of at least about 10% by weight crystalline sugar on a sugar solids basis, said percentage being based upon the weight of the dough-like mixture.

49. A method as claimed in claim 48 wherein said crystalline sugar comprises sucrose.

50. A method as claimed in claim 49 wherein at least one reducing sugar is admixed with said ingredients comprising flour in an amount which promotes Maillard browning.

51. A method as claimed in claim 42 wherein at least one protein source is admixed with said ingredients comprising flour in an amount which promotes Maillard browning.

52. A method as claimed in claim 42 wherein said dough-like mixture comprises:
 (a) less than about 20% by weight water,
 (b) from about 12% by weight to about 40% by weight shortening or fat,
 (c) from about 10% by weight to about 40% by weight of at least one sugar, on a sugar solids basis, and,
 (d) from about 30% by weight to about 70% by weight of at least one flour,
said percentages being based upon the weight of said dough-like mixture.

53. A method as claimed in claim 42 wherein the water is admixed with the heat treated mass at a heat treated mass temperature of from about 110° F. to about 212° F. to obtain said substantially homogeneous cookie dough-like mixture.

54. A method as claimed in claim 42 wherein said ingredients are heated in said cooker extruder to a temperature of from about 300° F. to about 500° F. to form said heat treated mass.

55. A method as claimed in claim 42 wherein said at least one sugar comprises a reducing sugar.

56. A method as claimed in claim 42 wherein said flour comprises at least one member selected from the group consisting of wheat flour, corn flour, oat flour, barley flour, rye flour, rice flour, potato flour, grain sorghum flour, corn starch, and physically and/or chemically modified flours or starches.

57. A method for the production of cookies comprising:
 (a) heating ingredients comprising flour, and shortening or fat, in a cooker extruder to a temperature of at least about 150° F. to form a heat treated mass,
 (b) admixing at least one sugar and water with the heat treated mass in said extruder to obtain a substantially homogeneous dough-like mixture,
 (c) forming the dough-like mixture into pieces, and
 (d) leavening the pieces by subjecting them to microwave energy.

58. A method as claimed in claim 57 wherein said ingredients are heated in said cooker extruder to a temperature of at least about 200° F. to form said heat treated mass.

59. A method as claimed in claim 58 wherein said heat treated mass is cooled to a temperature of less than about 150° F. so as to avoid substantial separation of oil and to avoid extruder surging.

60. A method as claimed in claim 57 wherein the water content of said dough-like mixture is less than about 15% by weight, based upon weight of the dough-like mixture.

61. A method as claimed in claim 57 wherein the shortening or fat content of said dough-like mixture is at least about 12% by weight, based upon the weight of the dough-like mixture.

62. A method as claimed in claim 57 wherein a crystalline sugar is admixed with said heat treated mass while cooling the heat treated mass in an amount of at least about 10% by weight crystalline sugar on a sugar solids basis, said percentage being based upon the weight of the dough-like mixture.

63. A method as claimed in claim 62 wherein said crystalline sugar comprises sucrose.

64. A method as claimed in claim 63 wherein at least one reducing sugar is admixed with said ingredients comprising flour in an amount which promotes Maillard browning.

65. A method as claimed in claim 57 wherein at lest one protein source is admixed with said ingredients comprising flour in an amount which promotes Maillard browning.

66. A method as claimed in claim 57 wherein said dough-like mixture comprises:
 (a) less than about 20% by weight water,
 (b) from about 12% by weight to about 40% by weight shortening or fat,
 (c) from about 10% by weight to about 40% by weight of at least one sugar, on a sugar solids basis, and,
 (d) from about 30% by weight to about 70% by weight of at least one flour,
said percentages being based upon the weight of said dough-like mixture.

67. A method as claimed in claim 57 wherein the water is admixed with the heat treated mass at a heat treated mass temperature of from about 110° F. to about 212° F. to obtain said substantially homogeneous cookie dough-like mixture.

68. A method as claimed in claim 57 wherein said ingredients are heated in said cooker extruder to a temperature of from about 300° F. to about 500° F. to form said heat treated mass.

69. A method as claimed in claim 57 wherein the dough-like mixture is extruded at a temperature of from about 100° F. to about 212° F.

70. A method for the production of cookies comprising:
 (a) heating ingredients comprising flour, and shortening or fat, in a cooker extruder to a temperature of at least about 150° F. to form a heat treated mass,
 (b) admixing at least one sugar and water with the heat treated mass in said extruder to obtain a substantially homogeneous dough-like mixture,
 (c) forming the dough-like mixture into pieces, and
 (d) leavening the pieces by subjecting them to dielectric radio frequency heating.

71. A method as claimed in claim 70 wherein said ingredients are heated in said cooker extruder to a temperature of at least about 200° F. to form said heat treated mass.

72. A method as claimed in claim 71 wherein said heat treated mass is cooled to a temperature of less than about 150° F. so as to avoid substantial separation of oil and to avoid extruder surging.

73. A method as claimed in claim 70 wherein the water content of said dough-like mixture is less than about 15% by weight, based upon the weight of the dough-like mixture.

74. A method as claimed in claim 70 wherein the shortening or fat content of said dough-like mixture is at least about 12% by weight, based upon the weight of the dough-like mixture.

75. A method as claimed in claim 70 wherein a crystalline sugar is admixed with said heat treated mass while cooling the heat treated mass in an amount of at least about 10% by weight crystalline sugar on a sugar solids basis, said percentage being based upon the weight of the dough-like mixture.

76. A method as claimed in claim 75 wherein said crystalline sugar comprises sucrose.

77. A method as claimed in claim 76 wherein at least one reducing sugar is admixed with said ingredients comprising flour in an amount which promotes Maillard browning.

78. A method as claimed in claim 70 wherein at least one protein source is admixed with said ingredients comprising flour in an amount which promotes Maillard browning.

79. A method as claimed in claim 70 wherein said dough-like mixture comprises:
(a) less than about 20% by weight water,
(b) from about 12% by weight to about 40% by weight shortening or fat,
(c) from about 10% by weight to about 40% by weight of at least one sugar, on a sugar solids basis, and,
(d) from about 30% by weight to about 70% by weight of at least one flour,
said percentages being based upon the weight of said dough-like mixture.

80. A method as claimed in claim 70 wherein the water is admixed with the heat treated mass at a heat treated mass temperature of from about 110° F. to about 212° F. to obtain said substantially homogeneous cookie dough-like mixture.

81. A method as claimed in claim 70 wherein said ingredients are heated in said cooker extruder to a temperature of from about 300° F. to about 500° F. to form said heat treated mass.

82. A method as claimed in claim 70 wherein the dough-like mixture is extruded at a temperature of from about 100° F. to about 212° F.

* * * * *